(12) United States Patent
White

(10) Patent No.: US 11,565,609 B1
(45) Date of Patent: Jan. 31, 2023

(54) LOW-PROFILE CATENARY HANGER

(71) Applicant: Paul F. White, Wellesley, MA (US)

(72) Inventor: Paul F. White, Wellesley, MA (US)

( * ) Notice: Subject to any disclaimer, the term of this patent is extended or adjusted under 35 U.S.C. 154(b) by 0 days.

(21) Appl. No.: 17/845,061

(22) Filed: Jun. 21, 2022

(51) Int. Cl.
   *B60M 1/24* (2006.01)
(52) U.S. Cl.
   CPC .................................. B60M 1/24 (2013.01)
(58) Field of Classification Search
   CPC .......... B60M 1/24; B60M 1/20; B60M 1/225; B60M 1/23; B60M 1/234
   See application file for complete search history.

(56) References Cited

U.S. PATENT DOCUMENTS

| | | | | |
|---|---|---|---|---|
| 487,332 | A | * 12/1892 | Lindahl | B60M 1/24 |
| | | | | 191/43 |
| 802,305 | A | 10/1905 | McIlwain | |
| 931,356 | A | 8/1909 | Varney | |
| 1,017,741 | A | * 2/1912 | Denneen | B60M 1/23 |
| | | | | 191/41 |
| 1,033,104 | A | * 7/1912 | Jellinek et al. | B60M 1/24 |
| | | | | 191/40 |
| 1,050,643 | A | 1/1913 | Gilmore | |
| 1,055,691 | A | 3/1913 | Aalborg | |
| 1,080,712 | A | * 12/1913 | Mead et al. | B60M 1/24 |
| | | | | 191/43 |
| 1,142,378 | A | 6/1915 | Starkey | |
| 1,207,483 | A | 12/1916 | Bolus | |
| 1,207,653 | A | * 12/1916 | Starkey | B60M 1/24 |
| | | | | 191/41 |
| 1,250,952 | A | * 12/1917 | Bovard | B60M 1/23 |
| | | | | 191/41 |
| 1,296,748 | A | * 3/1919 | Bolus et al. | B60M 1/23 |
| | | | | 191/41 |
| 1,336,503 | A | 4/1920 | Brown et al. | |
| 1,360,006 | A | * 11/1920 | Morgan | B60M 1/24 |
| | | | | 191/42 |
| 1,401,650 | A | 12/1921 | Schaake | |
| 1,401,999 | A | 1/1922 | Manz et al. | |

(Continued)

FOREIGN PATENT DOCUMENTS

| | | |
|---|---|---|
| JP | S5774228 A | 5/1982 |
| JP | S57107922 A | 7/1982 |

*Primary Examiner* — Zachary L Kuhfuss
(74) *Attorney, Agent, or Firm* — Thomas P. O'Connell; O'Connell Law Firm

(57) ABSTRACT

A low-profile catenary hanger, catenary wire system, and a method for supporting an electrical contact wire in relation to a messenger wire wherein a wire clamping assembly clamps about the contact wire, and a wire corral assembly is fixed to the clamping assembly. The corral assembly defines an adjustable reception corral through which the messenger wire is received without fastening so that the contact wire can rise without a consequent lifting of the messenger wire. The clamping assembly has a first clamping member with a keystone-shaped projection and a second clamping member with a keystone-shaped slot that can slidably receive the keystone-shaped projection to fix the clamping members together by operation of a setscrew. The clamping members together define a wire reception volume, and each clamping member has an engaging tooth whereby a contact wire with opposed longitudinal grooves can be clamped and retained by the clamping assembly.

26 Claims, 27 Drawing Sheets

(56) References Cited

U.S. PATENT DOCUMENTS

| | | | |
|---|---|---|---|
| 1,459,174 A | 6/1923 | Wrenn et al. | |
| 1,563,386 A | 12/1925 | McGee | |
| 1,586,758 A | 6/1926 | Matthes | |
| 1,592,369 A | 7/1926 | Jorstad | |
| 1,643,209 A | 9/1927 | Griffith | |
| 1,668,346 A | 5/1928 | Varney | |
| 1,685,431 A * | 9/1928 | Samuels | B60M 1/23 191/40 |
| 1,692,104 A | 11/1928 | Wrenn | |
| 1,728,820 A * | 9/1929 | Bower | B60M 1/23 191/40 |
| 1,756,316 A | 4/1930 | Viele | |
| 1,802,046 A | 4/1931 | Bower | |
| 1,810,733 A | 6/1931 | Schaake | |
| 1,834,659 A | 12/1931 | Teramoto | |
| 1,886,463 A * | 11/1932 | Birch | B60M 1/23 191/41 |
| 2,013,355 A | 9/1935 | Matthes | |
| 2,041,110 A | 5/1936 | Birch | |
| 2,239,582 A | 4/1941 | Wahlberg et al. | |
| 2,239,656 A | 4/1941 | Sparhawk | |
| 2,287,692 A | 6/1942 | Matthes | |
| 2,288,726 A * | 7/1942 | Samuels | B60M 1/225 191/40 |
| 2,325,788 A | 8/1943 | Matthes | |
| 2,338,510 A | 1/1944 | Hanna et al. | |
| 2,354,869 A | 8/1944 | Matthes | |
| 2,404,088 A | 7/1946 | Pinkerton | |
| 2,426,151 A | 8/1947 | Matthes | |
| 2,436,089 A | 2/1948 | Birch | |
| 2,491,973 A | 12/1949 | Hanna et al. | |
| 3,085,775 A * | 4/1963 | Crates | H01R 4/38 191/40 |
| 3,586,307 A | 6/1971 | Brownyer | |
| 3,644,688 A | 2/1972 | Tustin et al. | |
| 3,829,630 A | 8/1974 | Belyaev | |
| 4,208,969 A | 6/1980 | Baltensperger et al. | |
| 4,398,624 A | 8/1983 | Seddon | |
| 4,454,389 A | 6/1984 | Oda et al. | |
| 4,637,594 A | 1/1987 | Saito et al. | |
| 5,730,265 A * | 3/1998 | Lemaire | B60M 1/225 191/40 |
| 8,757,340 B2 | 6/2014 | White | |
| 2013/0306422 A1 | 11/2013 | White | |
| 2014/0284161 A1 | 9/2014 | White | |

\* cited by examiner

LOW-PROFILE CATENARY HANGER

FIELD OF THE INVENTION

The present invention resides in the field of suspension apparatuses for overhead contact systems. More particularly, disclosed herein is an apparatus and method for suspending an overhead electrical contact line or trolley contact wire from a messenger wire in a low-profile catenary manner wherein the trolley contact wire is free to float and rise unencumbered during the passage of an electric railway vehicle current collector.

BACKGROUND OF THE INVENTION

Electrically powered railway vehicles, such as streetcars, trolley buses, light rail vehicles, and electric railroad locomotives, utilize a current collecting device, such as a trolley pole or pantograph, that is mounted on the vehicle roof and that has a contact surface that rides along the bottom of a trolley contact wire. Suspension of the trolley contact wire in a catenary suspension system is accomplished with devices referred to as catenary hangers that attach to the trolley contact wire in a fixed manner and are connected to the suspending messenger wire either in a loose manner or by a rigid connection.

A rigid connection at the messenger wire does not allow the trolley contact wire to easily lift as the current collector passes under it since the current collector must then lift both wires. Stiffness of suspension thus occurs. This can lead to a rippling effect where the current collector experiences slight bouncing under the series of rigid catenary hangers, which can lead to arcing. Arcing damages the trolley contact wire as the action produces a burning that destroys small pieces of the wire, which leads to a reduction in cross-sectional area. Over time, continual arcing may lead to the trolley contact wire losing cross-section to the extent that it cannot resist the tensile forces to which it is subjected and, therefore, will break.

A loose connection is often formed by a catenary hanger with a clamp attached to the trolley contact wire and a flat strap or a round rod in a looped configuration disposed over the messenger wire. Flexible wire catenary hangers allow the trolley contact wire to lift. However, they are limited in the vertical clearance allowed by their clamps.

Catenary hangers are typically of various fixed lengths with the position of the catenary hanger arranged in a span between support towers. Longer lengths are disposed at the beginning of the span, and the hangers descend in length to the shortest hanger in the middle of the span. Each hanger length is precalculated for its particular position along the span length so that the total weight of the trolley contact wire suspended from the messenger wire hangs level and parallel with the tracks as the weight of the entire assembly is supported by the messenger wire. Sag is compensated for by the length of the hangers to keep the trolley contact wire level. Such catenary hangers are typically not adjustable in length. Accordingly, the inclusion of a hanger that is too short will lift the trolley contact wire up, and the inclusion of a hanger that is too long will allow the trolley contact wire to sag down, both preventing the trolley contact wire from being level.

Other types of catenary hangers use flexible wires where a single clamp is used at both the messenger wire and the trolley contact wire with a flexible hanger wire connecting them. Its length can be either precalculated or adjusted during installation to achieve the correct length. Flexible hangers allow the trolley contact wire to lift unencumbered as the vehicle current collector passes underneath it, providing a smooth passage without arcing for the current collector.

The catenary hangers described are typically made from copper alloys and are inherently electrically conducting. They often use a clamp on the trolley contact wire that is composed of two pieces held together with a bolt or screw in a hinge-like fashion. The height of the clamp thus must be sufficient to permit clamping to the groove of the trolley contact wire, to have either the strap, rod, or flexible wire attached to it, and to make space for the clamping bolt holding the two clamp pieces together. This gives rise to a hanger that cannot achieve a very low-profile height, and the possible shortness of the overall length is limited. Where very short distances are encountered, a catenary clamp, sometimes referred to as a duplex clamp, must be used. A duplex clamp is a double clamp that connects to the trolley contact wire and the messenger wire in a rigid fashion. In such applications, the vehicle current collector must lift not only the weight of the trolley contact wire but also the weight of the messenger wire since both are rigidly attached and become one electrical conductor.

In some very low-profile settings, such as under low bridges, the messenger wire is substituted with a trolley wire. The trolley wire is spliced into the messenger and effectively becomes the messenger wire in the low-profile area. With the messenger wire and the trolley contact wire clamped together, they become an integral unit and are unable to move separately from each other. The resulting system is referred to as a contenary system as opposed to a catenary system.

Many inventors have tried to address the difficulties of flexibility and length adjustment in catenary hangers. For example, U.S. Pat. No. 931,356 to Varney describes a trolley hanger used as a catenary hanger with two clamps, one on the trolley contact wire and the other on the messenger wire with two flat bars connected to them and to each other. With the securing bolts of the structure loosened, the bars can be adjusted in length as they are moved into the desired position. Once positioned, the bolts are tightened to secure the bars. At this point, the assembly becomes a rigid catenary hanger that prevents free and unencumbered uplift to the trolley contact wire. The length of the hanger between the messenger wire and the trolley contact wire is limited to the permitted articulation of the two bars, and the dimensions of the bolting hardware with height of the trolley contact wire clamp impose a lower limit on the height of the profile.

U.S. Pat. No. 1,886,463 to Birch shows a catenary hanger consisting of a flat strap curved over the messenger wire in a loose fashion and clamped rigidly to the trolley contact wire clamp. The length of the catenary hanger is not adjustable but is fixed and must be of a particular length when placed in a span between supports as shown in FIG. 5 of that patent. To allow the trolley contact wire to be level, the catenary hanger allows uplift from the current collector as shown in FIGS. 3 and 4 of that patent, but the movement of the strap against the messenger wire to prevent arcing causes frictional wear of the wire strands. The hangers are designed to be installed in an alternating fashion where the groove lips in the wire clamp are offset, which causes the loop of the hanger to slide against the messenger wire by design and not to remain vertical but to be disposed at a slight angle to vertical.

In U.S. Pat. No. 1,728,820 to Bower, a catenary hanger is composed of a U-shaped loop that is of one size per hanger assembly. As shown in FIG. 2 of the Bower patent, the hanger is not adjustable vertically. The loop is attached to a clamp ear that must be peened over to form a fit into the groove of the trolley wire. No bolt or screw is used to fix it into the wire. This peening into the groove is permanent, and the clamp ear cannot be removed without physically bending its lower edges or jaw open with a special tool used in the industry known as an "ear lifter". Removing the ear permanently distorts it and renders its reuse impossible. The ear has two lugs or tongues at its top for the attachment of the U-shaped loop. The bottom of the loop has a slot on each side that slides over the ear's lug, and the lug is bent down or clenched with a hammer to keep the slot secure against the ear lug. This cannot be removed without bending the lug back up to allow the slot of the U-shaped loop to be pulled out. The assembly as shown in FIG. 2 of the Bower patent is not designed for low profile suspension since sufficient height is required for the transverse head, vertical shoulders, and longitudinal web of the hanger.

In U.S. Pat. No. 1,142,378 by Starkey, a catenary hanger is shown with a vertical strap or suspension member that is either straight as shown in FIG. 5 or twisted as shown in FIG. 2 of the Starkey patent. The hanger has a loop that attaches to a messenger wire, but the loop is fixed, and its height is not adjustable vertically. The suspension member is of a fixed length having a loop at the top for attachment to a messenger wire and a tight bend at the bottom for attachment to an elongated slot opening in the fin of member A, which has a longitudinal groove for two lips. These are forced into the groove of the trolley wire by banging in or peening with a hammer, by crimping, or by other means. Once attached to the groove of the trolley wire, the hanger cannot be removed without physically bending the lower edges or jaw open using a special tool used in the industry known as an "ear lifter". Removing the ear permanently distorts it and renders its reuse extremely difficult or impossible. Vertical adjustment of the hanger assembly is prevented since it is of an established length. The assembly is made of conductive metal without insulation so that arcing will occur between the messenger wire and the hanger and electrical current will be interrupted when the hanger lifts off the messenger wire from the vertical force of the current collector.

U.S. Pat. No. 1,207,483 to Bolus discloses a catenary hanger with a two-piece clamp that, when clamped tightly, holds a suspension member that is U-shaped to form a loop at the end thereof that attaches to a messenger wire. The U-shaped member has twisted ends that fit into the trolley wire clamp and are parallel with the trolley wire while its loop is perpendicular to the messenger wire, which in turn runs parallel to the trolley wire. The U-shaped suspension has formed headed ends that fit into notches in each half of the clamping member. A bolt is inserted through each clamping member to close it tightly against the trolley wire and the U-shaped suspension. The height of the two-piece clamping member is such that the hanger does not provide a low-profile height. Further, the U-shaped clamping member is of one size. Its length is not adjustable. To obtain the least vertical height, the U-shaped member must be preformed to the lowest height possible to allow it to rise on the messenger wire from the upward force of the current collector. By the nature of the construction of the two-piece clamping member, its height is inherently restricted by the horizontal bolt fastening device through the two clamp holes that holds the clamps and the U-shaped suspension member together.

U.S. Pat. No. 1,586,758 to Matthes discloses a Conductor Support that can be considered a catenary hanger that suspends the trolley wire from a messenger cable. The construction of the conductor support consists of two separate clamping devices A and B, each with a looped rod shaped into a link, one fixed and the other able to be opened or closed. The two-piece clamping members have a lug and a depression into which the opposite lug fits. This places the first U-shaped support rod attached to clamping member B in a position where its loop is parallel to the trolley wire. As a result, it cannot be hung from a messenger wire. The conductor support assembly can only be attached to a messenger wire with a second U-shaped support and a separate clamping member A attached to the messenger wire. The clamping member B that is attached to the trolley wire has a looped rod that is parallel to the trolley wire. The second support looped rod attached to clamping member B loops through the looped rod attached to clamping member B so that it provides a means for vertical lift. However, as the clamps A and B are tightly attached to the messenger wire and the trolley wire, respectively, there is no means for any movement along the track, and any differential movement between the messenger wire and the trolley contact wire results in the two loops pulling horizontally against each other. This type of movement tends to distort the vertical support and can cause the clamps A and B to pull against their respective wires and cause a kink in the wires. Further, clamp B must be of a vertical height sufficient to allow carriage bolt 16 and loop rod 24 at its end 25 to fit into the clamp. This demands a greater vertical height such that the hanger assembly cannot adopt a low-profile configuration.

In U.S. Pat. No. 1,296,748 to Bolus and Darrah, a trolley wire hanger is revealed with two vertical suspension rods to which an adjustable yoke member is attached to obtain a vertical dimension above the trolley contact wire. The vertical rods are integral to two clamping jaws that are connected to the vertical rods through a formed eye held in place tightly and dependently to a bolt that closes the two clamping jaws onto the trolley wire. The vertical rods cannot be adjusted in width since they are formed to a particular width to conform to the dimension of the yoke member. Although the yoke member is vertically adjustable along the vertical rods, it can only accommodate the size messenger wire to which the inside radius of the yoke's messenger wire bearing surface is formed. This prevents adjustability horizontally to accommodate different diameter messenger cables as the formed vertical rods and sliding yoke are set for a particular diameter messenger cable. Further, the vertical rods must be upset to keep the yoke from sliding off in the event a side setscrew of the hanger becomes loose. Upsetting the ends of the rods requires a tool and hammer. Moreover, if the vertical rods are altered in the field, such as by cutting, the tool and a hammer must be used to upset the newly cut off ends.

Accordingly, despite the many efforts of inventors of the prior art, there remains a need for a hanger capable of achieving an extremely low profile that enables a trolley contact wire to be reliably suspended from a messenger wire with a very short distance between the two wires while permitting the trolley contact wire to rise freely in response to the application of force by a current collector.

SUMMARY OF THE INVENTION

In view of the long-felt and recognized needs in the field of trolley wire hangers and the inability of the known prior art to meet the same, the present invention is founded on the basic object of providing a low-profile catenary hanger capable of suspending a trolley contact wire from a messenger wire with a very short distance between the wires.

A further object of embodiments of the invention is to provide a low-profile catenary hanger that reliably suspends a trolley contact wire from a messenger wire while permitting the trolley contact wire to rise in response to the application of force by a current collector traveling along the trolley contact wire.

These and further objects and advantages of the present invention will become obvious not only to one who reviews the present specification and drawing but also to those who have an opportunity to experience embodiments of the low-profile catenary hanger disclosed herein in operation. It will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more objects of the invention, an embodiment of the invention can be characterized as a low-profile hanger for supporting a supported wire, such as an electrical contact wire, in relation to a supporting wire, such as a messenger wire. The hanger comprises a wire clamping assembly operative to clamp about the supported wire in combination with a wire corral assembly that, when the hanger is assembled, is fixed to the clamping assembly. The wire corral assembly defines a wire reception corral through which the supporting wire can be received. The wire reception corral, which may be adjustable in height, is adapted to have a height greater than a cross-sectional height of the supporting wire, and the wire corral assembly is not fastened to the supporting wire such that the supporting wire can move freely within the wire reception corral. Under such constructions, when the supported wire is clamped by the wire clamping assembly and when the supporting wire passes through the wire corral assembly, the supported wire can rise a given amount without a consequent lifting of the supporting wire.

As disclosed herein, the clamping assembly comprises first and second clamping members. The first clamping member has a locking projection, which may be a keystone-shaped projection, and the second clamping member has a locking slot, which may be a keystone-shaped slot, that is sized and shaped in correspondence to the locking projection. With this, the keystone-shaped projection of the first clamping member can be slidably received into the keystone-shaped slot in the second clamping member. Moreover, a threaded borehole can be disposed through the second clamping member with an end open to the keystone-shaped slot, and a setscrew can be received into the borehole to press when advanced in the borehole against the keystone-shaped projection of the first clamping member to fix the first clamping member relative to the second clamping member.

The first and second clamping members cooperate to define a supported wire reception volume, and the first and second clamping members are operative to receive and selectively clamp upon the supported wire within the supported wire reception volume. More particularly, the hanger can be adapted to support a supported wire that has opposed first and grooves that communicate longitudinally along the supported wire. In such practices, the first clamping member can have a first engaging tooth for being received into the first groove of the supported wire, and the second clamping member can have a second engaging tooth for being received into the second groove of the supported wire. The first and second teeth are disposed in opposition when the first clamping member is engaged with the second clamping member so that the teeth can be received into the grooves of the supported wire. The clamping assembly can be locked in place by advancement of the setscrew to cause the first clamping member to press the supported wire into locking engagement with the teeth of the first and second clamping members.

According to disclosed embodiments of the low-profile hanger, the wire corral assembly can have a base member for being fixed to the clamping assembly, first and second leg portions that project in opposition to one another and away from the base member, and an upper portion that spans between the first and second leg portions. The base member, the first and second leg portions, and the upper portion cooperate to define the wire reception corral through which the supporting wire can be received.

In one such example, the wire corral assembly is formed with a U-shaped member. A base of the U-shaped member forms the base member of the wire corral assembly, legs of the U-shaped member form the first and second leg portions of the wire corral assembly, and a cross-bolt forms the upper portion of the wire corral assembly with the cross-bolt spanning across the first and second leg portions of the wire corral assembly. In certain embodiments, slots are disposed in the first and second leg portions of the U-shaped member such that the cross-bolt can be adjusted in position along the slots in the first and second leg portions to adjust the height of the wire reception corral.

In another embodiment, the wire corral assembly is formed with a base frame member for being fixed to the clamping assembly to form the base member of the wire corral assembly. A U-bolt has first and second legs that are received through the base frame member to form the first and second leg portions of the wire corral assembly, and the U-bolt has an arcuate portion that spans between the first and second legs to form the upper portion of the wire corral assembly. The first and second legs of the U-bolt can be threaded, and threaded fasteners can selectively fix the first and second legs of the U-bolt relative to the base frame member. The threaded fasteners can be selectively advanced or retracted along the first and second legs of the U-bolt to adjust the height of the wire reception corral.

In a further embodiment, the wire corral assembly is formed with a base frame member for being fixed to the clamping assembly to form the base member of the wire corral assembly. First and second rods form the first and second leg portions of the wire corral assembly, and an upper frame member retained by the first and second rods forms the upper portion of the wire corral assembly. The first and second rods can be threaded, and threaded fasteners are employed for selectively fixing the upper frame member relative to the base frame member. The threaded fasteners can be selectively advanced or retracted along the first and second rods to adjust the height of the wire reception corral In embodiments of the low-profile hanger, flanges can project from the base member toward the clamping assembly. The flanges can be spaced by a distance, and the clamping assembly, such as the second clamping member thereof, can have first and second end faces for being received at least partially between the flanges that project from the base member. The first and second end faces of the clamping assembly are spaced to be closely received between the flanges that project from the base member. With this, relative rotation between the corral assembly and the clamping assembly is prevented.

It is further disclosed herein that the first and second clamping members can be formed from a ceramic material to prevent electrical arcing. Additionally or alternatively, an insulating barrier of insulative material can be provided that is sized and shaped in correspondence to the wire corral assembly for lining the inside of the wire corral assembly against electrical contact with the supporting wire.

In certain embodiments, the wire corral assembly has a base member fixed to the clamping assembly, first and second leg portions that project in opposition to one another and away from the base member, and an upper portion that spans between the first and second leg portions. The base member, the first and second leg portions, and the upper portion cooperate to define the wire reception corral through which the supporting wire can be received. The base member has a central portion and first and second wing portions that are stepped upwardly relative to the base member away from the clamping assembly. So constructed, the low-profile hanger provides clearance for the passage of a trolley pole current collector shoe past the clamping assembly.

Still further, embodiments of the low-profile hanger are disclosed wherein an electrically-conductive pig-tail wire is employed to promote the arc-free passage of electrical current through the catenary hanger. For instance, the pig-tail wire can have a first end electrically connected to the wire corral assembly and a second end for connecting to the supporting wire. To facilitate electrical connection of the pig-tail wire to the supporting wire, a spring clip can be provided that can be selectively received over the supporting wire. The spring clip has a receiving notch for receiving and retaining the pig-tail wire with the body portion of the pig-tail wire traversing between the wire corral assembly and the supporting wire with sufficient excess length to permit free movement of the supporting wire within the wire reception corral.

Embodiments of the invention can alternatively be characterized as a wire clamping assembly for clamping about a wire. The wire clamping assembly has a first clamping member with a locking projection and a second clamping member with a locking slot that is sized and shaped in correspondence to the locking projection. The locking projection of the first clamping member can be slidably received into the locking slot in the second clamping member. The first and second clamping members cooperate to define a supported wire reception volume, and the first and second clamping members are operative to receive and selectively clamp upon the wire within the wire reception volume.

In certain embodiments of the wire clamping assembly, the locking projection comprises a keystone-shaped projection and the locking slot comprises a keystone-shaped slot so that the keystone-shaped projection of the first clamping member can be slidably received into the keystone-shaped slot in the second clamping member. A threaded borehole may be disposed through the second clamping member with an end open to the locking slot, and a setscrew can then be received into the borehole to press when advanced against the locking projection of the first clamping member to fix the first clamping member relative to the second clamping member.

Furthermore, the disclosed wire clamping assembly can be adapted to clamp upon a supported wire, such as a trolley contact wire, that has opposed first and grooves that communicate longitudinally along the supported wire. To facilitate this, the first clamping member has a first engaging tooth for being received into the first groove of the supported wire, and the second clamping member has a second engaging tooth for being received into the second groove of the supported wire. The first and second teeth are disposed in opposition when the first clamping member is engaged with the second clamping member.

In other manifestations, the invention can be characterized as a catenary wire system with a low-profile catenary hanger supporting an electrical contact wire in relation to a messenger wire. The catenary wire system can, for instance, comprise a messenger wire that traverses a span and an electrical contact wire that is retained below the messenger wire. A wire clamping assembly is operative to clamp about the electrical contact wire, and a wire corral assembly is fixed to the clamping assembly. The wire corral assembly defines a wire reception corral through which the messenger wire is received, and the wire reception corral is adapted to have a height greater than a cross-sectional height of the messenger wire. The wire corral assembly is not fastened to the messenger wire. As a result, the messenger wire can move freely within the wire reception corral. Under such embodiments, when the electrical contact wire is clamped by the wire clamping assembly and when the messenger wire passes through the wire corral assembly, the electrical contact wire can rise a given amount without a consequent lifting of the messenger wire.

Still further, embodiments of the invention can be characterized as a method for suspending an electrical contact wire below a messenger wire by use of a low-profile catenary hanger. The method can include providing a wire clamping assembly operative to clamp about the electrical contact wire and a wire corral assembly fixed to the clamping assembly. The wire corral assembly defines a wire reception corral through which the messenger wire can be received. The wire reception corral is adapted to have a height greater than a cross-sectional height of the messenger wire. The method can further include clamping the wire clamping assembly on the electrical contact wire and causing the messenger wire to pass through the wire corral assembly within the wire reception corral without a fastening of the wire corral assembly to the messenger wire. The messenger wire can thus move freely within the wire reception corral, and the electrical contact wire can rise a given amount without a consequent lifting of the messenger wire.

The low-profile catenary hanger and the method for employing the same enable a trolley contact wire to be suspended from a messenger wire with a very short distance between the two wires, such as but not limited to a distance of approximately one inch measured from the top of the trolley contact wire to the underside of the messenger wire.

Under typical prior art configurations, messenger wires are maintained above the trolley contact wire at a minimum height distance of approximately six inches. In this regard, it will be noted that, when both wires must be profiled down to clear overhead obstructions, such as bridge overpasses or low ceiling subways, the messenger wire will normally be reduced in height to clear the obstruction while the trolley contact wire must be kept at a certain height above the tracks to accommodate minimum operating heights of vehicle current collectors. Prior art attempts at providing very low profiles often involve having the messenger wire, which typically consists of a stranded cable, spliced to the trolley wire in the low clearance area, but this prevents the trolley contact wire from lifting on its own. With the two wires closely clamped together to provide the required overhead clearance, a heavier spot is formed in the trolley contact wire along the low clearance area. The current collector is thus forced to push against two wires rather than one, and this creates more resistance to uplift. This method of clamping the trolley contact wire to the trolley messenger wire is referred to as a 'contenary' configuration as compared to a catenary configuration in which a hanger of a minimum length which allows the trolley contact wire to lift independently from the messenger wire. According to IEEE 1791-2019—IEEE Recommended Practice for Terminology Used for Direct Current Electric Transit Overhead Contact Systems, 'contenary' is a term derived from catenary and references the situation where the messenger wire 100 and trolley contact wire 102 profile are so close to one another that the two wires must be clamped together to form a one wire set as can be seen in FIG. 14. For instance, where the messenger wire is a stranded cable, it may be spliced to a solid trolley wire for clamping thereto.

According to embodiments of the invention, the trolley contact wire can be suspended from the messenger wire in very close proximity, such as with approximately one inch of separation. Although extremely close to one another, the two wires are not clamped together, and the trolley contact wire is free to rise as the pressure from the current collector pushes against it. The permitted rise of the trolley contact wire prevents the occurrence of hard spots as would occur at clamp suspension points that would otherwise lead to accelerated trolley contact wire wear and, additionally or alternatively, arcing due to the added weight of the messenger wire. The low-profile catenary hanger thus mimicks the messenger/trolley contact wire relationship of a standard catenary system. In certain embodiments, this is accomplished by use of a catenary hanger clamp of very low height formed with two pieces that are slid together without a hinge bolt to be disposed above the trolley contact wire and, when assembled into a catenary hanger, to permit a free rising separate of the messenger wire.

Embodiments of the present invention will be compared to prior art catenary hanger clamps of two pieces that are hinged through a cross bolt disposed, for instance, in the center of the clamp thereby requiring more height to accommodate the construction of the clamp and the bolt. The two-piece sliding trolley contact wire clamp of embodiments of the present invention can, for instance, have each piece placed on the trolley contact wire groove and can have the pieces slid into each other to create a closed, solid, low-profile clamp. The clamp may be held together by a keystone-shaped projection on one of the clamp pieces that slides into a mirror image keystone groove formation on the other clamp piece thus keeping the clamp pieces together. One clamp piece can thus be referred to as a keystone clamp piece while the other clamp piece may be referred to as a groove clamp piece.

The assembled clamp may be prevented from sliding on the groove of the trolley contact wire by a set screw. Securing the set screw with either a U-strap or a holding plate channel attached into the groove clamp piece against the keystone clamp piece forces the two clamp pieces to spread away from each other and to be disposed tightly against the trolley contact wire grooves. This creates a friction fit that secures the clamp pieces to the trolley contact wire. While other catenary clamps use cross bolt hinges where a bolt pulls clamp pieces together to create a friction fit against the sides of the trolley contact wire groove, the clamp pieces of embodiments of the present invention, however, create pressure against not only the sides of the trolley contact wire grooves but also against the top of the trolley contact wire thereby providing greater resistance to sliding. Inside grooves of the clamp, including metallic or ceramic embodiments, may have a roughened surface, such as a surface consisting of a series of notches. When forced tightly against the trolley wire grooves, the notches provide additional resistance to slipping on the grooves of the trolley contact wire.

The disclosed clamp can be tightened from above thereby avoiding side clamp obstructions as where horizontal hinge clamp bolts are employed. As a result, trolley pole current collector shoes can be used with embodiments of the disclosed invention. The shape of the clamp and the U-strap or holding plate channel thereof are such that embodiments of the disclosed invention can accommodate pantograph current collectors and trolley poles with shoe current collectors. This is an important feature where the hangers are to be used on railways running both two types of current collectors on the same line.

In one embodiment, suspension of the clamp from the messenger wire is accomplished with a flat strap hanger channel that has a U shape. An adjustable cross slot bolt is disposed in a vertical slot. An inverted U-shaped rod is employed in another embodiment. The width of the strap to accommodate particular size messenger wires can be either wide or narrow during forming. To facilitate larger diameter messenger wires, a straight section near the clamp assembly can be flared out and then in to become vertical at a greater width than at the clamp. This is done to accommodate larger messenger wires and to facilitate the trolley pole current collector shoe clearance. The cross-slot bolt can be raised vertically along the hanger to provide a set height and distance between the two wires. This ability for vertical adjustment allows the trolley contact wire to be set at a particular height above the tracks keeping the trolley contact wire parallel to the tracks while the messenger wire sags with its own weight and the weight of the trolley contact wire. A holding plate is used to secure the cross-slot bolt. The holding plate can be slightly bowed outwardly and can be of a spring material similar to a Belleville Washer so that, when tightened, the holding plate springs in as it flattens and provides additional locking capability for the cross-slot bolt to prevent loosening. The channel shape of the U-strap keeps it from rotating as the flanges of the channel sit over the hanger body to provide a snug fit.

The U-strap hanger can be connected to the trolley contact wire clamp with a set screw that secures the strap to the clamp. Rotation of the strap is prevented since the flanges of the strap are of such a width that they fit over the end sides of the clamp where the strap connects to the clamp top. Once the set screw is tightened, the strap is completely secured within the clamp due to the holding power of the set screw. The strap cannot rotate or move due to the flanges extending over the ends of the clamp.

In certain embodiments, the set screw has a countersunk head with a socket hole for tightening. The head fits into the countersunk U-strap hole at the strap clamp interface so that the head of the screw lies flat within the inside top of the strap. The set screw can have a cone point at its end that sets into a conical dimple where the sides of the set screw cone point bear against the sides of the conical dimple and force the keystone clamp piece away from the groove clamp piece and against the trolley contact wire grooves. This pushing also forces the keystone clamp piece against the trolley contact wire thereby securing a tight fit to the grooves of the trolley wire.

In an alternative embodiment of the hanger, a rod is formed in a semi-circular shape with two threaded rod segments projecting downwardly in a U-bolt configuration. The rod segments of the U-bolt protrude through an attachment plate to form a channel. The structure so formed is screwed onto the top of the catenary hanger body, such as with a setscrew. The sides of the hanger body keep the hanger plate secure from twisting when screwed down tightly. Flanges of the strap are of such a width that they fit exactly over the end sides of the clamp where the strap connects to the clamp top. The two rod segments of the U-bolt go through corresponding holes in each side of the plate, and threaded nuts secure the rod segments in place. One nut may be disposed on the bottom of the plate and another nut may be disposed on top of the plate. The effective length of the U-bolt can be controlled by the four nuts by selectively positioning them along the threaded rod segments of the U-bolt and then tightening them in place with the plate therebetween. Excess lengths of the rod segments protruding beyond the plate, which could foul the current collector, can be cut off, such as immediately distal to the distal nut, potentially after the length of the hanger is determined or bent outward for clearance.

In a further embodiment of the catenary hanger, a flat holding plate channel is secured to the top of an upper clamp piece with a set screw and plate combination, potentially as previously described. The plate can have two holes or slots with a vertical threaded rod inserted into the holes or slots and secured, such as with nuts on the top and bottom of the plate. The holding plate channel is prevented from twisting by its side flanges bearing against the sides of the top clamp. A half clamp is placed onto the two vertical threaded rods, and the half clamp can be placed over the messenger wire to create a bearing surface. The half clamp is selectively positioned for obtaining the vertical distance needed for suspending the trolley contact wire from the messenger wire. Once positioned, two nuts per threaded rod are tightened to secure the half clamp in place. The threaded rods can be kept in place or cut off, such as at the top of the clamp, or bent over if obstructions to the messenger wire are encountered.

Embodiments of the catenary hanger can be metallic in nature and therefore able to carry electrical current between the messenger wire and the trolley wire. This action may cause an arc to develop at the interface of the cross-slot bolt and its spacer when the upward pressure of the current collector lifts the trolley wire and the catenary hanger up and off of the messenger wire as it passes. The destructive influence of this arcing can be prevented by the use of a messenger insulator placed on the messenger wire relative to which the U-strap or U-bolt is retained.

In yet another embodiment of the invention, the catenary hanger itself can be insulated from the uninsulated messenger wire without the use of a messenger wire insulator by the insertion of an insulating barrier strip that is formed to the interior configuration of the U-strap and is placed over it thereby preventing the metallic portion of the U-strap from connecting with the messenger wire. In such embodiments, the sides of the insulating barrier strip can be of a width slightly greater than the width of the U-strap hanger and can have formed edges on vertical members thereof to fit over the edges of the U-strap. The vertical members can have slits in the middle thereof to allow a spacer tube bolt to protrude therethrough and for the bolt to be positioned along the hanger strap. When the bolt is tightened, the barrier is compressed by the spacer tube and closes the slit. With use of the barrier strip and a non-conductive spacer tube, such as a fiberglass tube, rather than a metallic and electrically conducting tube, the hanger interior surface becomes insulated and non-conducting. The use of the barrier strip and the non-conducting tube insulates the interior surface of the hanger between the messenger wire and the contact wire such that no electrical current will flow and no arcing will occur.

In still another embodiment of the invention, the catenary hanger can be made non-conducting by changing the material of the upper and lower clamps to an industrial grade ceramic material that is non-conducting and that possesses high mechanical strength. The ceramic wire clamp can be a two-piece sliding clamp that can be placed on the trolley contact wire groove with clamp pieces slid into one another to create a closed solid low-profile clamp. The ceramic clamp can be constructed and retained as previously described with a keystone shaped projection on a keystone clamp piece and a keystone groove in a groove clamp piece. The ceramic clamp assembly so formed can be fixed against sliding on the groove of the trolley contact wire, such as by a setscrew or any other effective method. Even where the setscrew is metallic and connected to an energized U-strap hanger or holding plate channel as the hanger straps are touching the electrified messenger wire, it can remain isolated and insulated from the trolley contact wire by not penetrating through the lower clamp to contact the trolley contact wire. Because the upper and lower clamp pieces are made from a ceramic material, they insulate the trolley contact wire from the set screw, holding plate, and hanger straps thus making the catenary hanger assembly electrically non-conducting.

In yet another embodiment of the invention, the low-profile hanger can be made electrically conductive without arcing between the hanger and the messenger wire by adding a pig-tail wire from the cross-slot bolt of the U-strap hanger or connected to the U-strap holding plate between the rod nuts and plate of the U-bolt hanger. The pig-tail wire is then attached tightly to the messenger wire with a loop spring but with sufficient slack so that it does not bind as the hanger moves up and down or longitudinally along the trolley contact wire. The spring holds the pig-tail wire tight to the messenger wire and conducts electrical current from the messenger wire to the cross-slot bolt or U-strap holding plate and then to the trolley contact wire. The loop spring has a space on the bottom of it for the pig-tail wire to be held fast against the messenger wire without crushing the wire strands. The wire can be attached through a crimp sleeve connection designed for attaching wires to bolts. Electrical current can then flow through the bolt to the U-strap and to the trolley contact wire. The pig-tail wire can be clamped to the messenger wire, such as is described above, and then run down to the top nut of the U-bolt to be attached thereto, such as through a crimp sleeve connection designed for attaching wires to bolts. Electrical current can then flow through the bolt and nut to the connection plate channel, to the clamp, and to the trolley contact wire of the suspension.

One will appreciate that the foregoing discussion broadly outlines certain more important goals and certain features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

The present invention will be described with additional specificity and detail with reference to the accompanying drawings wherein.

DETAILED DESCRIPTION OF PREFERRED EMBODIMENTS

The low-profile catenary hanger disclosed herein and the systems and methods employing the same are subject to widely varied embodiments. However, to ensure that one skilled in the art will be able to understand and, in appropriate cases, practice the present invention, certain preferred embodiments of the broader invention revealed herein are described below and shown in the accompanying drawing figures.

Figure 1:
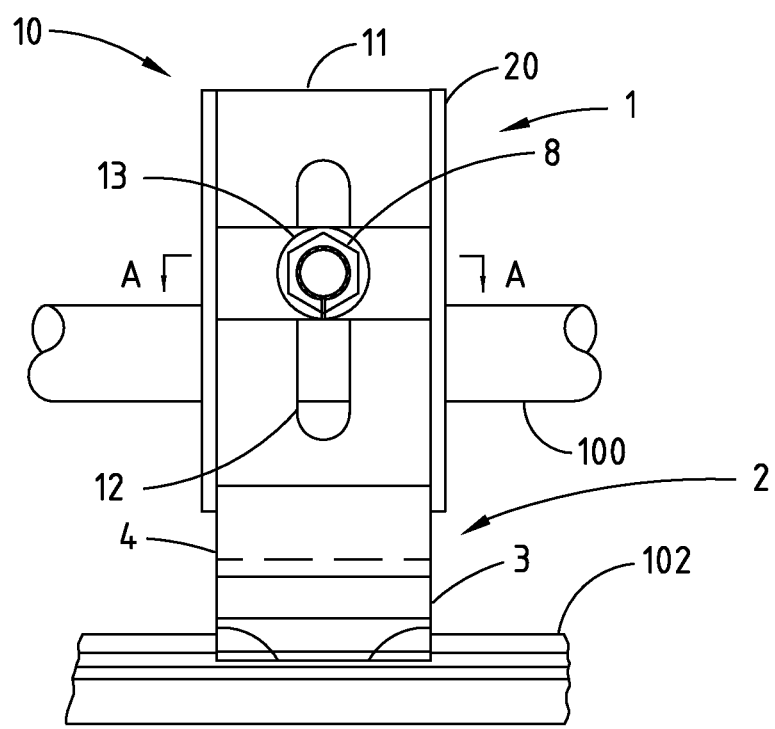
FIG. 1 is a view in side elevation of a low-profile catenary hanger according to the present invention.
Figure 1A:
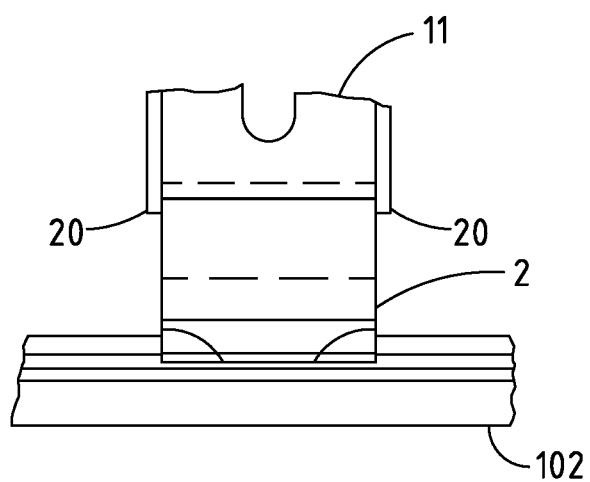
FIG. 1A is a view in side elevation of the U-shaped member of the catenary hanger of FIG. 1 engaged with the clamping assembly.
Figure 2:
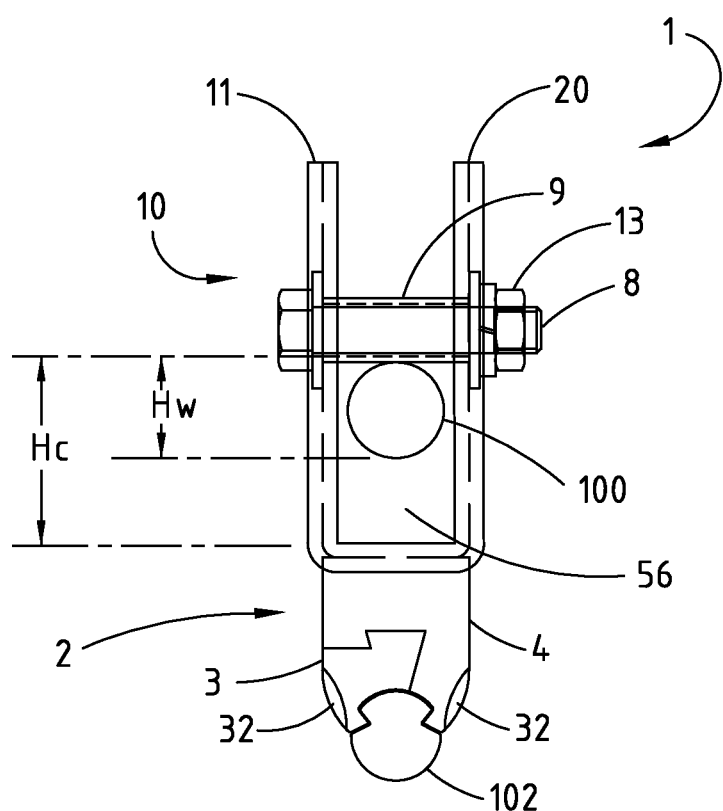
FIG. 2 is a view in front elevation of the low-profile catenary hanger of FIG. 1.
Figure 3:
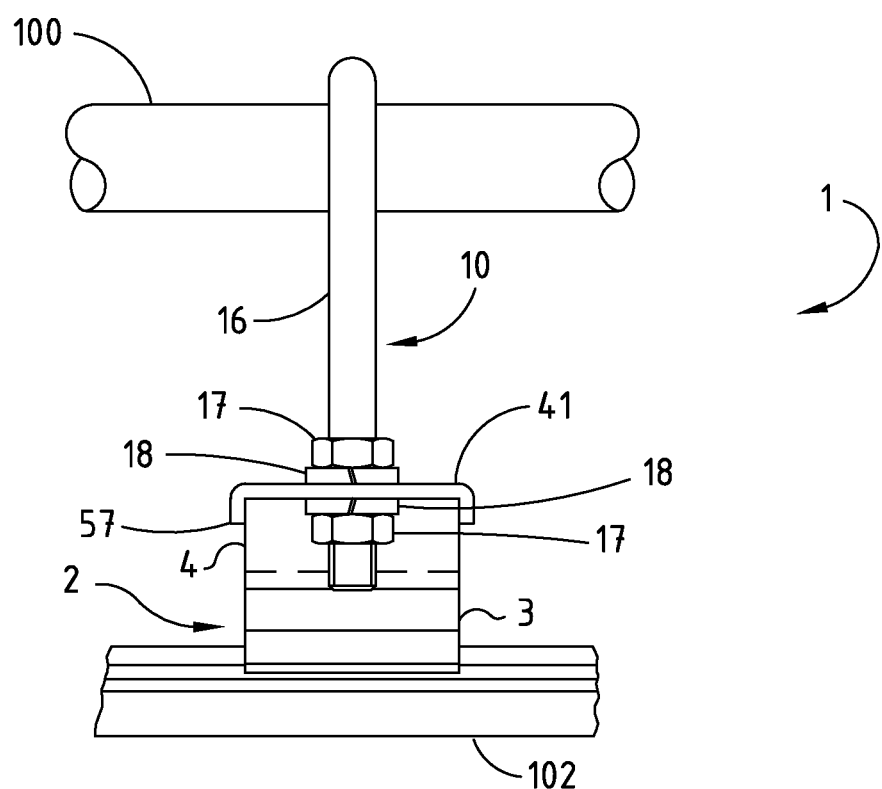
FIG. 3 is a view in side elevation of an alternative embodiment of the low-profile catenary hanger disclosed herein.
Figure 4:
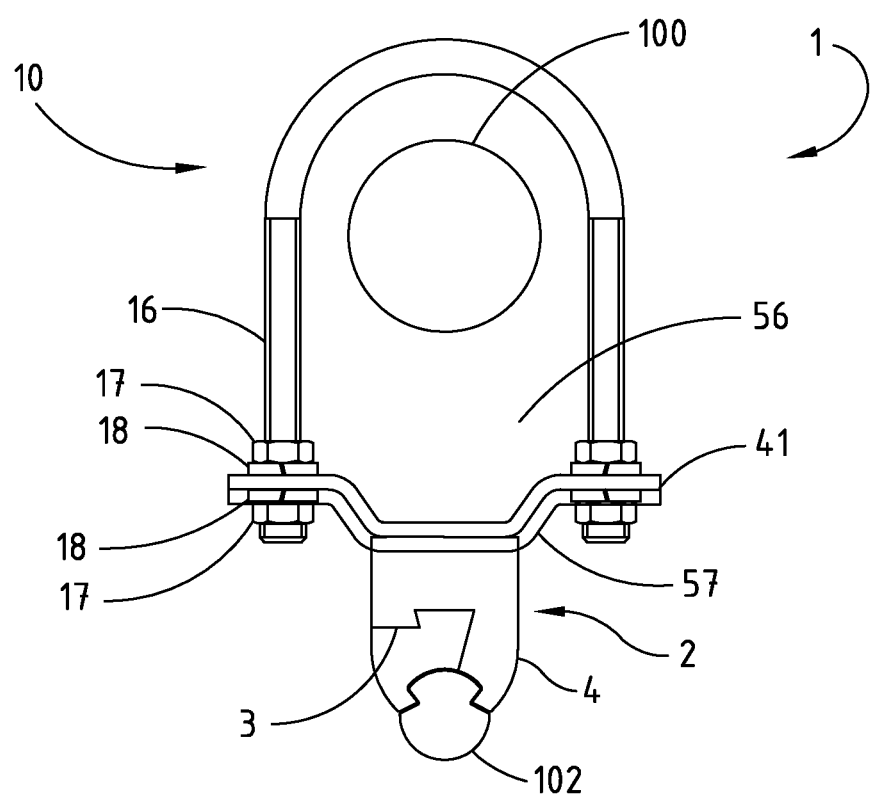
FIG. 4 is a view in front elevation of the low-profile catenary hanger of FIG. 3.
Figure 13:
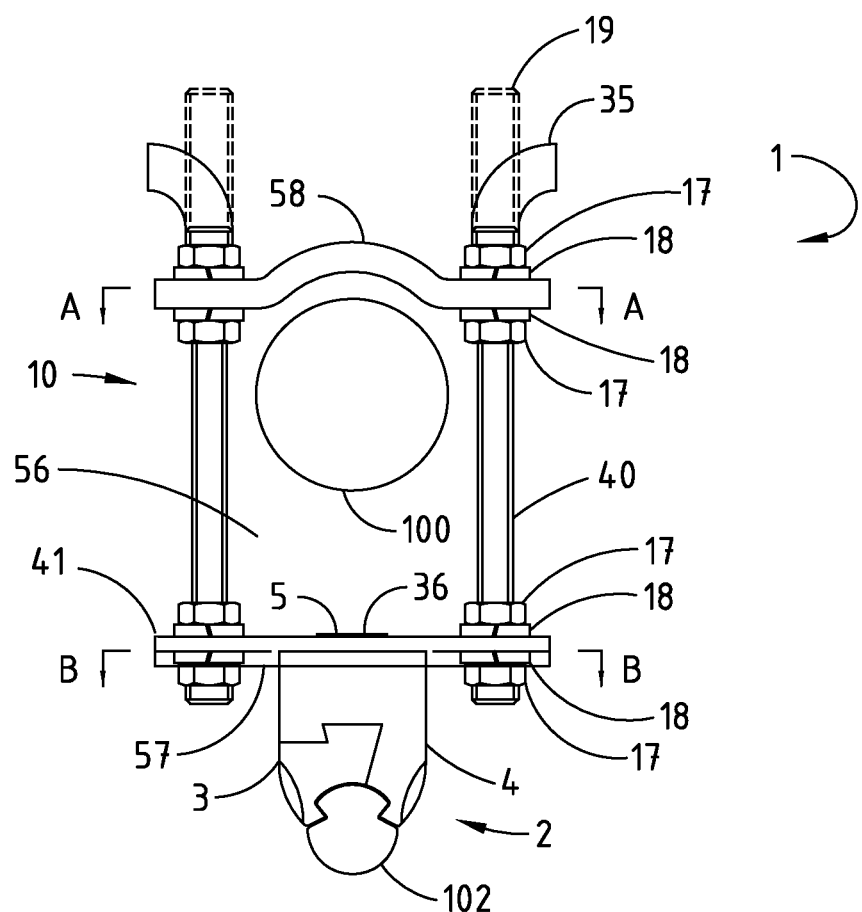
FIG. 13 is a view in front elevation of an alternative embodiment of the low-profile catenary hanger.

Turning more particularly to the drawings, a first embodiment of a low-profile catenary hanger according to the present invention is indicated generally at 1 in FIGS. 1 and 2. An alternative embodiment of the low-profile catenary hanger 1 is depicted in FIGS. 3 and 4, and a further embodiment of the low-profile catenary hanger 1 is shown in FIG. 13. Each embodiment of the catenary hanger 1 is capable of exhibiting an extremely low profile to enable a trolley contact wire 102 to be suspended from a messenger wire 100 with a very short distance between the two wires 100 and 102 while nonetheless permitting the trolley contact wire 102 to rise in response to the application of force by a current collector.

Figure 5:
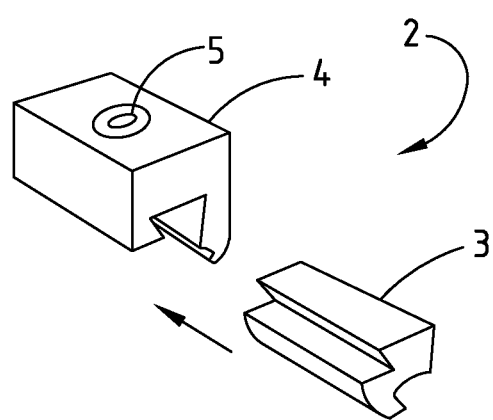
FIG. 5 is a perspective view of a first clamping member positioned for engagement with a second clamping member.

Each of the manifestations of the low-profile catenary hanger 1 provides a trolley wire clamping assembly 2 that positively engages the trolley contact wire 102 and, in particular, the grooves 104 and 106 that communicate longitudinally along the trolley contact wire 102. As can be further understood with additional reference, for instance, to FIGS. 5 through 7, the trolley wire clamping assembly 2 incorporates first and second clamping members 3 and 4, which may alternatively be referred to as lower and upper clamping members 3 and 4 respectively. One clamping member 3 or 4 has a keystone-shaped projection 25 while the other clamping member 4 or 3 has a keystone-shaped slot 26 that is dimensionally sized and shaped in correspondence to the keystone-shaped projection 25. In the depicted embodiment, the keystone-shaped projection 25 is formed as a portion of the first or lower clamping member 3 to face upwardly while the keystone-shaped slot 26 is disposed within the second or upper clamping member 4 to face downwardly, but it will be understood that the keystone-shaped projection 25 and the keystone-shaped slot 26 could be oppositely disposed within the scope of the invention except as it may be expressly limited by the claims.

Figure 5A:
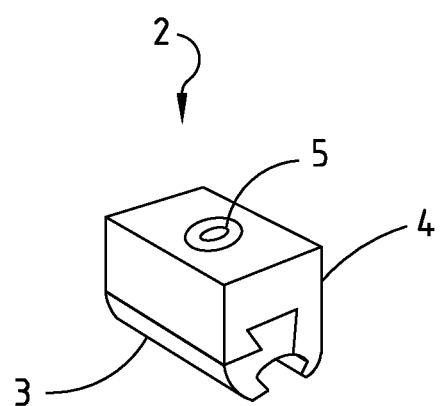
FIG. 5A is a perspective view of the first clamping member engaged with the second clamping member.
Figure 10:
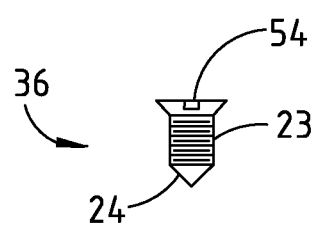
FIG. 10 is a view in side elevation of a setscrew as in embodiments of the present invention.

The keystone-shaped projection 25 and the keystone-shaped slot 26 communicate longitudinally along the first and second clamping members 3 and 4. As such, the first and second clamping members 3 and 4 can be slidingly engaged with one another to cause the upwardly-facing keystone-shaped projection 26 to be matingly received into the downwardly-facing keystone-shaped slot 26 as is depicted, for instance, in FIG. 5A to form the clamping assembly 2. The first and second clamping members 3 and 4 can then be selectively fixed in relation to one another, such as by operation of a setscrew 36, which is shown apart in FIG. 10. There, the setscrew 36 can be perceived to have a screw head 54, a threaded body 23, and a pointed distal tip 24. The second clamping member 4 has a threaded borehole therethrough for threadedly receiving the setscrew 36. In the depicted embodiment, the borehole extends through what may be considered the main body of the second clamping member 4 with a proximal end open to the upper surface of the second clamping member 4 and a distal end open to the keystone-shaped slot 26. The second clamping member 4 has a frustoconical countersink hole 5 for receiving the screw head 54, and the keystone-shaped projection 25 of the first clamping member 3 has a conical dimple 6 therein for receiving and engaging the tip 24 of the setscrew 36 when it is fully received through the borehole in the second clamping member 4. When the first and second clamping members 3 and 4 are slid into engagement and the setscrew 36 is fully advanced to cause the tip 24 thereof to press into the conical dimple 6 in the first clamping member 3, the first and second clamping members 3 and 4 are locked in relation to one another as the keystone-shaped projection 25 is pressed into locking engagement with the keystone-shaped slot 26. The keystone-shaped projection 25 and the keystone-shaped slot 26 prevent the first and second clamping members 3 and 4 from separating from one another and from lifting off of the trolley contact wire 102 when it is received as shown and described herein.

Figure 15:
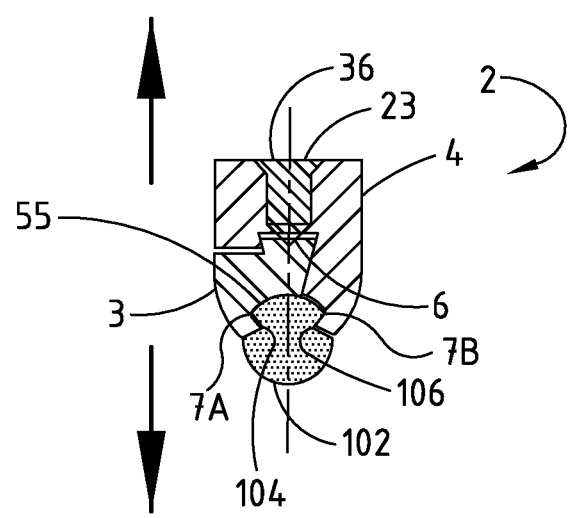
FIG. 15 is a cross-sectional view of the first and second clamping members fixed in relation to one another by a setscrew.

As seen in FIG. 15, for example, the first and second clamping members 3 and 4 cooperate to define a longitudinally communicating trolley wire reception volume 55 through which the clamping members 3 and 4 are adapted to matingly receive and lockingly engage a trolley contact wire 102. In this regard, it will be noted that a trolley contact wire 102 typically has a generally circular cross section with first and second grooves 104 and 106 that communicate longitudinally along the trolley contact wire 102 with an arcuate upper portion traversing between the first and second grooves 104 and 106. The first and second clamping members 3 and 4 cooperate to define a correspondingly shaped trolley wire reception volume 55 with an arcuate upper portion and first and second engaging teeth 7A and 7B that are disposed in opposition to be respectively received into the first and second grooves 104 and 106 of the trolley contact wire 102. More particularly, the first clamping member 3 has a formation defining an arcuate segment of the arcuate upper portion of the reception volume 55 and a formation comprising the first engaging tooth 7A while the second clamping member 4 has a formation defining an arcuate segment of the arcuate upper portion of the reception volume 55 and a formation comprising the second engaging tooth 7B. Under this construction, when the first and second clamping members 3 and 4 are slid into engagement with one another with a trolley contact wire 102 received into the reception volume 55 as, for example, in FIG. 15, the trolley wire clamping assembly 2 can be further locked in place relative to the trolley contact wire 102 by operation of the setscrew 36, which not only locks the first and second clamping members 3 and 4 relative to one another but which also locks the first and second engaging teeth 7A and 7B with respect to the grooves 104 and 106 of the trolley contact wire 102 as the first clamping member 3 presses downwardly under the force of the setscrew 36 to press the trolley contact wire 102 into engagement with the teeth 7A and 7B.

Figure 12:
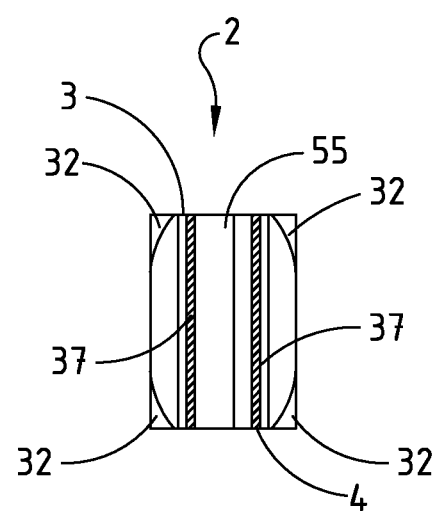
FIG. 12 is a bottom plan view of an embodiment of the clamping assembly.

With additional reference to FIG. 12, one can perceive that each of the arcuate segments of the first and second clamping members 3 and 4 that cooperate to define the arcuate upper portion of the reception volume 55 has a pattern of surface deviations 37 disposed therealong for further locking the first and second clamping members 3 and 4 and the clamping assembly 2 in general to the trolley contact wire 102. One skilled in the art will be aware of a plurality of types of such surface deviations 37, including knurling, ridges, serrations, or any other type of surface deviation 37, each within the scope of the invention except as expressly excluded by the claims.

Figure 6:
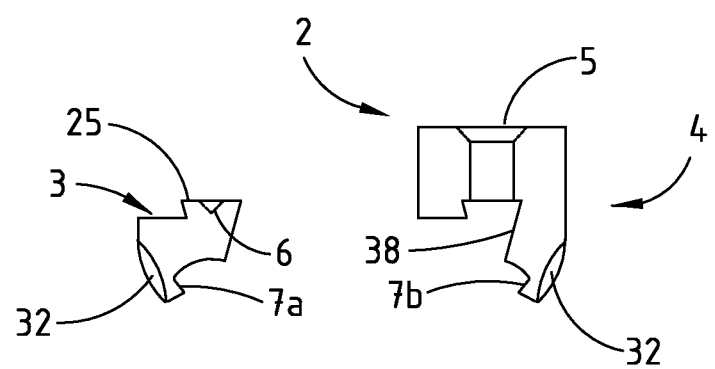
FIG. 6 is a view in front elevation of the first and second clamping members.
Figure 7:
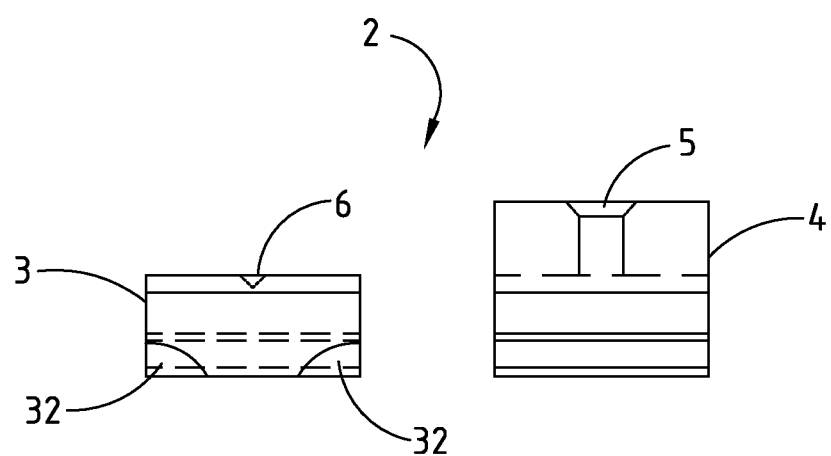
FIG. 7 is a view in side elevation of the first clamping member positioned for engagement with the second clamping member.
Figure 7A:
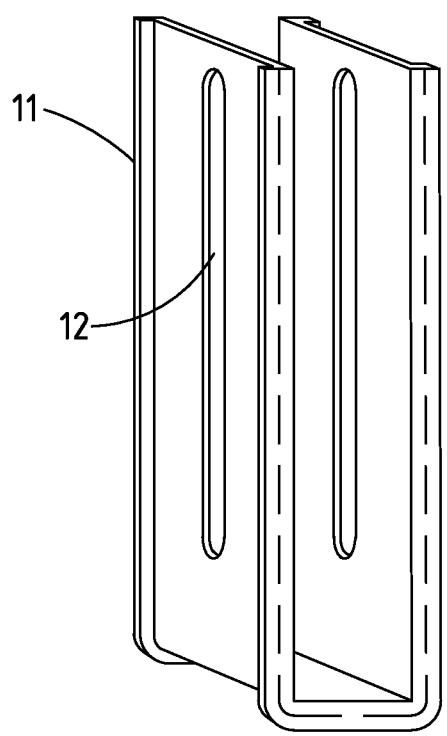
FIG. 7A is a perspective view of a U-shaped member according to the present invention.
Figure 7B:
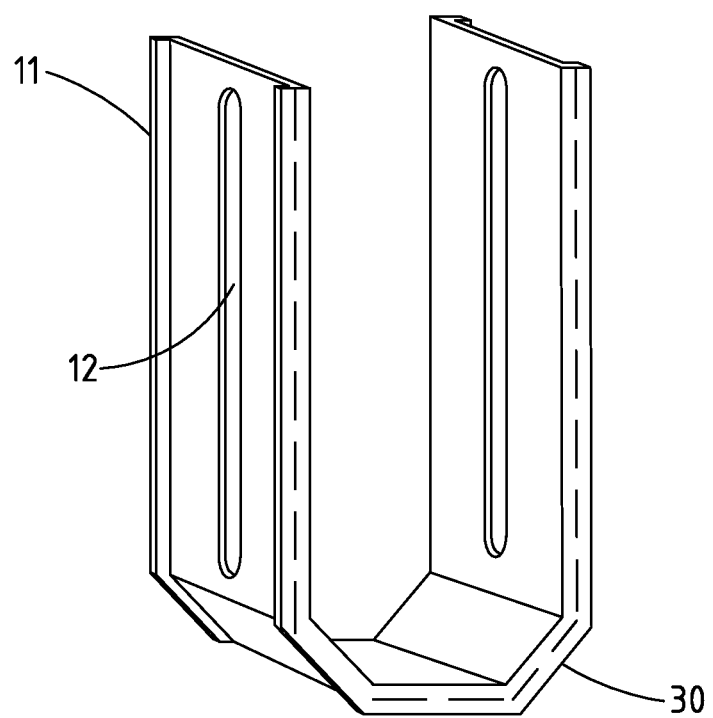
FIG. 7B is a perspective view of an alternative U-shaped member pursuant to the invention.
Figure 11:
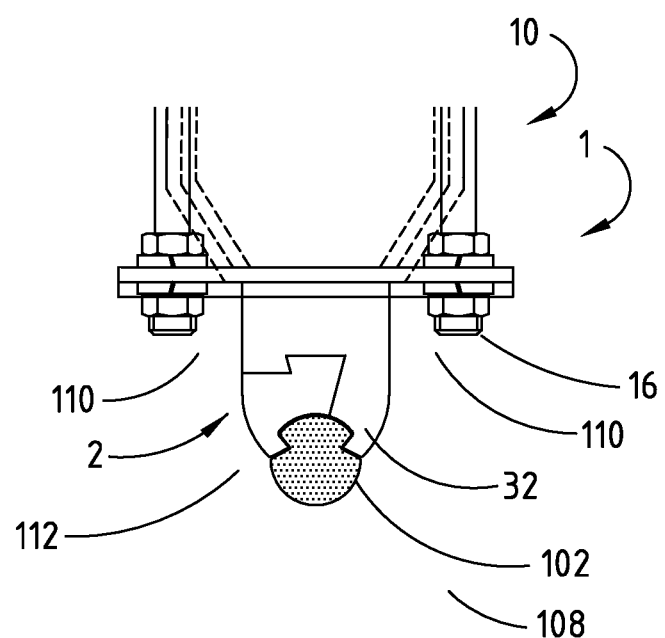
FIG. 11 is a view in front elevation of an embodiment of the catenary hanger with a trolley pole current collector shoe passing thereunder.

As can also be perceived with reference to FIGS. 11 and 12 and also in FIGS. 2, 6, and 7, the clamping assembly 2 formed by the first and second clamping members 3 and 4 can have tapered first and second end portions 32 to facilitate the smooth transition of a trolley shoe current collector 108 as it passes over the clamping assembly 2 as shown in FIG. 11. By way of example and not limitation, the tapered first and second end portions 32 can comprise arcuate portions with curved lateral and lower portions. The tapered first and second end portions 32 thus act as smooth interface tapers to promote smooth and unencumbered travel of the trolley shoe current collector 108 over the clamping assembly 2 and the low-profile catenary hanger 1 in general.

When the low-profile catenary hanger 1 is fully assembled as, for instance, in FIGS. 1 and 2, a messenger wire corral assembly 10 is fixed to the clamping assembly 2. As disclosed herein, the corral assembly 10 can vary in construction to pursue, for instance, the non-limiting examples of FIGS. 1, 2, 3, 4, and 13. In each of those embodiments, the messenger wire corral assembly 10 defines a bounded messenger wire reception corral 56, which may alternatively be referred to as a messenger wire reception passage 56, through which a messenger wire 100 can be received. The reception corral 56, which can be adjustable in height, bounds the messenger wire 100 therewithin but is not fastened to the messenger wire 100. As shown, for instance, in FIG. 2, the reception corral 56 can be adjusted to have a selected height $H_c$ that is greater than the height $H_w$ of the messenger wire 100 with it being recognized that the height $H_w$ of the messenger wire 100 will equal the diameter of the wire 100 where the wire 100 is round. Under this configuration, the messenger wire 100 and the trolley contact wire 102 can be readily deflected into and out of proximity with one another, and the trolley contact wire 102 can be raised by a given amount without a consequent lifting of the messenger wire 100.

In the embodiment of FIGS. 1 and 2, the corral assembly 10 is formed by a U-shaped member 11 with a base portion and first and second legs that project in parallel from the base portion. The legs of the U-shaped member 11 have slots 12 that communicate orthogonally to the base portion, and a cross bolt 8 is selectively fixed in relation to the slots 12 and the corral assembly 10 in general to adjust and then fix the height $H_c$ of the reception corral 56 and, in so doing, the vertical distance by which the trolley contact wire 102 can be displaced in relation to the messenger wire 100. The cross bolt 8 retains a spacing sleeve 9 to maintain the first and second legs of the U-shaped member 11 in a generally parallel configuration, and a nut 13 and washer 14 combination is operative to lock the cross bolt 8 at a selected position along the slots 12.

In the depicted embodiment, the U-shaped member 11 is formed with flat central panel portions forming the base portion and the first and second legs, and downwardly-projecting flanges 20 are disposed to traverse along the edges of the base portion and the first and second legs. First and second end faces of the second clamping member 4 of the clamping assembly 2 are perpendicular to the longitudinal orientation along which the keystone-shaped slot 26 and the keystone-shaped projection 25 travel and thus perpendicular to the longitudinal orientation of a messenger wire 100 and trolley contact wire 102 engaged by the catenary hanger 1. The width of the central panel portions and the spacing of the flanges 20 of the U-shaped member 11 are dimensioned to closely receive the first and second end faces of the second clamping member 4 thereby to prevent relative rotation between the U-shaped member 11 and the clamping assembly 2.

Where the base portion of the U-shaped member 11 is flat as in the depicted embodiment, the second clamping member 4 of the clamping assembly 2 can likewise be flat so that the facing surfaces correspond in shape and can be closely engaged. The U-shaped member 11 is fixed to the clamping assembly 2 in any effective manner. In the present embodiment, the U-shaped member 11 is fixed to the clamping assembly 2 by passage of the setscrew 36 through the base portion of the U-shaped member 11 and downwardly into the second clamping member 4 as previously described. As the setscrew 36 is tightened to a bottoming out position, the tip 24 of the setscrew 36 will push against the conical dimple 6 in the first clamp member 3, which will force the two clamp members 3 and 4 apart thereby locking the clamp members 3 and 4 together and causing the first and second engaging teeth 7A and 7B to press against the trolley wire grooves 104 and 106 to lock the catenary hanger 1 in relation to the trolley contact wire 102.

Constructed and assembled as disclosed herein, the clamping assembly 2 presents a slim width that can readily accommodate the passage of a trolley pole current collector shoe 108 used with trolley pole current collection, such as is typically used with Heritage Streetcars. The slimness of the clamping assembly 2 provides a clearance space 28 between the walls 110 of the collector shoe 108. To further accommodate the passage of collector shoe 108 and as referenced above, the clamping assembly 2 has tapered first and second end portions 32, such as arcuate end portions 32, to facilitate the smooth passage of collector shoe 108 and to avoid a blunt end that could otherwise damage the collector shoe carbon insert 112.

Figure 2A:
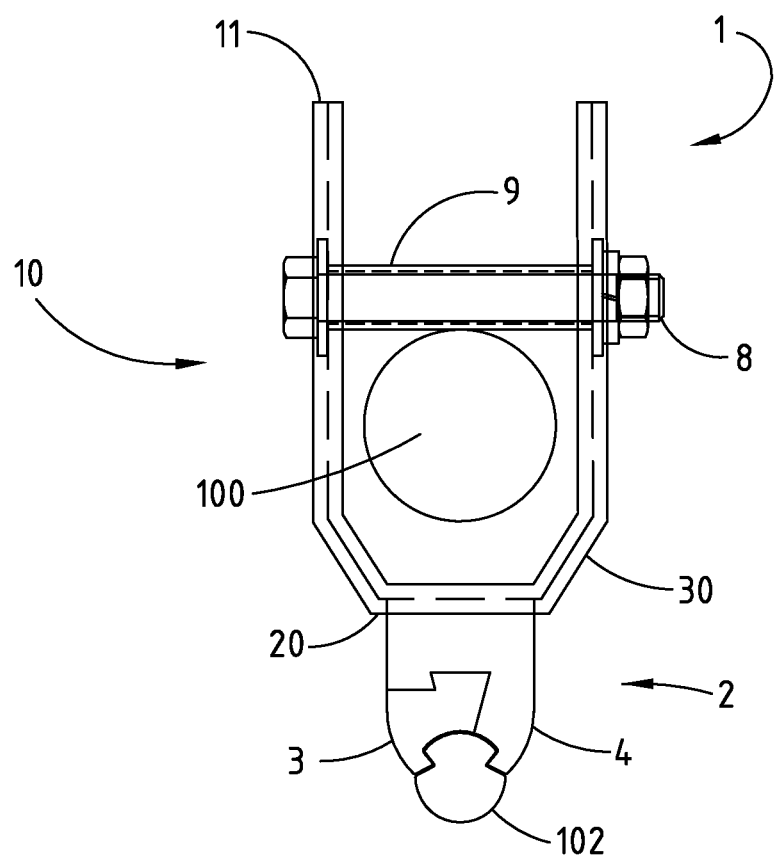
FIG. 2A is a view in front elevation of a further embodiment of the low-profile catenary hanger.

Comparing the embodiments of the low-profile hanger assembly 1 of FIGS. 2 and 2A, it will be noted that the first and second legs of the U-shaped member 11 could be straight as in FIG. 2 as may permit the passage of a messenger wire 100 of a given diameter. Alternatively, the first and second legs of the U-shaped member 11 could incorporate outwardly angled proximal portions 30 prior to achieving a generally parallel disposition thereby to provide added width between the first and second legs of the U-shaped member 11 to accommodate a larger diameter messenger wire 100 while still presenting a relatively narrow clamping assembly 2 to permit smooth passage of a trolley pole current collector shoe 108.

An alternative embodiment of the low-profile catenary hanger 1 is depicted in FIGS. 3 and 4. There, the catenary hanger 1 again incorporates a clamping assembly 2 with first and second clamping members 3 and 4, which may be configured and assembled as previously described. A corral assembly 10 that defines a messenger wire reception corral 56, which again may alternatively be referred to as a reception passage 56, is fixed to the clamping assembly 2. The fixation of the corral assembly 10 to the clamping assembly 2 again may be achieved by operation of the setscrew 36 passing through the base of the corral assembly 10 and into the second clamping member 4 or by any other effective method or combination thereof.

In the embodiment of FIGS. 3 and 4, however, the corral assembly 10 is formed by a U-bolt 16 in combination with a base frame member 41. The U-bolt 16 is disposed with the first and second threaded legs thereof pointing downwardly toward the clamping assembly 2, and the base frame member 41 spans from the first leg to the second leg of the U-bolt 16. The base frame member 41 in the illustrated example has a central portion and first and second wing portions that project laterally from the central portion. The first and second wing portions are stepped upwardly from the central portion by proximal and distal reversing bends between the central portion and the wing portions such that there are first and second end portions disposed in a plane approximately parallel to but raised from the plane in which the central portion is disposed with angled portions therebetween. The raised wing portions thus provide clearance for a trolley pole shoe (not shown in FIGS. 3 and 4) with respect to the wing portions and the legs of the U-bolt 16 passing therethrough. The wing portions have apertures therethrough for receiving the first and second legs of the U-bolt 16.

As can be perceived by combined reference to FIGS. 3 and 4, the central portion of the base frame member 41 has a flat panel portion that is bordered by downwardly-projecting flanges 57 that traverse along the edges of the central portion and the wing portions not only giving structural rigidity to the base frame member 41 but also preventing relative rotation between the U-bolt 16 and the clamping assembly 2. To facilitate this, the first and second end faces of the second clamping member 4 of the clamping assembly 2 are again perpendicular to the longitudinal orientation along which the keystone-shaped slot 26 and the keystone-shaped projection 25 travel and thus perpendicular to the longitudinal orientation of a messenger wire 100 and trolley contact wire 102 engaged by the catenary hanger 1. The width of the central portion and the spacing of the flanges 57 of the U-bolt 16 are dimensioned to closely receive the first and second end faces of the second clamping member 4 thereby to lock the base frame member 41 and the clamping assembly 2 against relative rotation.

Figure 8:
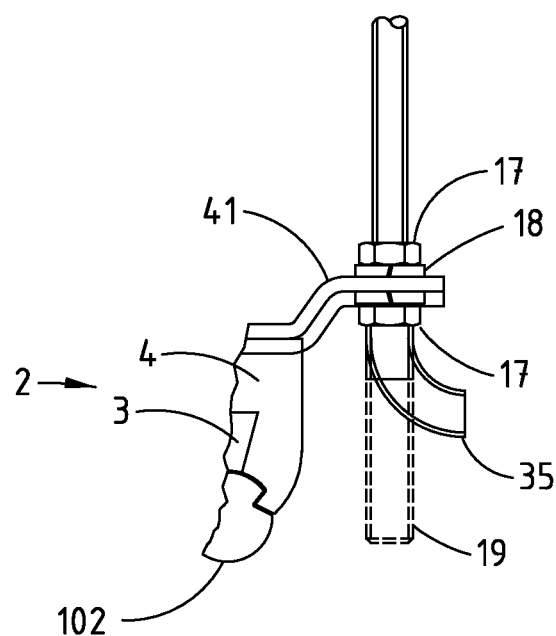
FIG. 8 is a cross-sectioned view of a clamping assembly with a stepped base frame member and an attached U-bolt as disclosed herein.

The height of the reception passage 56 and thus the distances by which the trolley contact wire 102 and the messenger wire 100 are spaced and relatively movable can be selectively adjusted by an adjustment of the position of the base frame member 41 along the first and second legs of the U-bolt 16. To accomplish that adjustment, the nuts 17 proximal and distal to the base frame member 41 can first be loosened relative to one another, then rotated or counter-rotated to advance or retract along the first and second legs of the U-bolt 16 until the desired wire spacing is reached, and then tightened against one another to lock the base frame member 41 in position. As shown, for instance, in FIG. 8, where excess portions of the U-bolt 16 extend beyond the base frame member 41 and the distal nuts 17, those extended portions can be cut away as indicated at 19 or bent outwardly as indicated at 35.

A further embodiment of the low-profile catenary hanger 1 is depicted in FIG. 13. The catenary hanger 1 incorporates a clamping assembly 2 with first and second clamping members 3 and 4 that are configured and assembled as previously described to clamp in relation to a trolley contact wire 102. A messenger wire reception corral 56, which again may alternatively be referred to as a reception passage 56, is formed by a corral assembly 10 that is fixed to the clamping assembly 2. Here, the corral assembly 10 is fixed to the clamping assembly 2 by the setscrew 36, which passes through the base of the corral assembly 10 and into the second clamping member 4. It will be understood, however, that the corral assembly 10 could be fixed to the clamping assembly 2 by further or different methods within the scope of the invention except as the claims may expressly exclude.

In the embodiment of FIG. 13, the corral assembly 10 is formed by a base frame member 41 in combination with an upper frame member 58 that is retained spaced from the base frame member 41 by first and second threaded rods 40 to define the messenger wire reception corral 56. The threaded rods 40 are retained in a parallel disposition with lower ends passed through apertures in the base frame member 41 and upper ends passed through apertures in the upper frame member 58. The base member 41 in this non-limiting example is formed as a flat plate that is bordered by downwardly-projecting flanges 57. The flanges 57 provide structural rigidity to the base frame member 41 while also preventing relative rotation between the base frame member 41, and thus the corral assembly 10, and the clamping assembly 2. The first and second end faces of the second clamping member 4 of the clamping assembly 2 are again perpendicular to the longitudinal orientation along which the keystone-shaped slot 26 and the keystone-shaped projection 25 travel and are thus perpendicular to the longitudinal orientation of a messenger wire 100 and trolley contact wire 102 engaged by the catenary hanger 1. The width of the central portion and the spacing of the flanges 57 of the base frame member 41 are dimensioned to closely receive the first and second end faces of the second clamping member 4 thereby to lock the base frame member 41 and the clamping assembly 2 against relative rotation.

The upper frame member 58 has a saddle-shaped arcuate central portion for being disposed atop a messenger wire 100. First and second outboard portions are disposed in a coplanar disposition with the arcuate central portion therebetween. The first and second threaded rods 40 are received through the first and second outboard portions of the upper frame member 58.

The height of the reception passage 56 and the distances by which the trolley contact wire 102 and the messenger wire 100 are consequently spaced and relatively movable can be selectively adjusted by an adjustment of the spacing of the base frame member 41 and the upper frame member 58. More particularly, the upper frame member 58 is positioned along the first and second threaded rods 40 by nuts 17 and lock washers 18 disposed proximally and distally to the upper frame member 58. In a similar manner, the nuts 17 and lock washers 18 are disposed proximally and distally to the base frame member 41. However, it will be understood that, rather than a nut 17 disposed proximally to the base frame member 41 relative to the clamping assembly 2, it is possible and within the scope of the invention for the threaded rods 40 to be formed as bolts with bolt heads disposed proximally to the base frame member 41. In any such construction, adjustment of the spacing of the frame members 41 and 58 and thus the height of the reception passage 56 can be adjusted by first loosening the nuts 17 and lock washers 18 of either or both frame members 41 and 58, then rotating or counter-rotating the same to advance or retract along the threaded rods 40 until the desired wire spacing is reached, and then tightening against one another to lock the respective member or members 41 and 58 in position. As shown in FIG. 13, where excess portions of the threaded rods 40 extend beyond a frame member 41 or 58 past the distal nuts 17, those extended portions can be cut away as indicated at 19 or bent outwardly as indicated at 35 to ensure clearance with respect to adjacent structures or, potentially, a trolley pole collector shoe (not shown in FIG. 13).

Figure 13A:
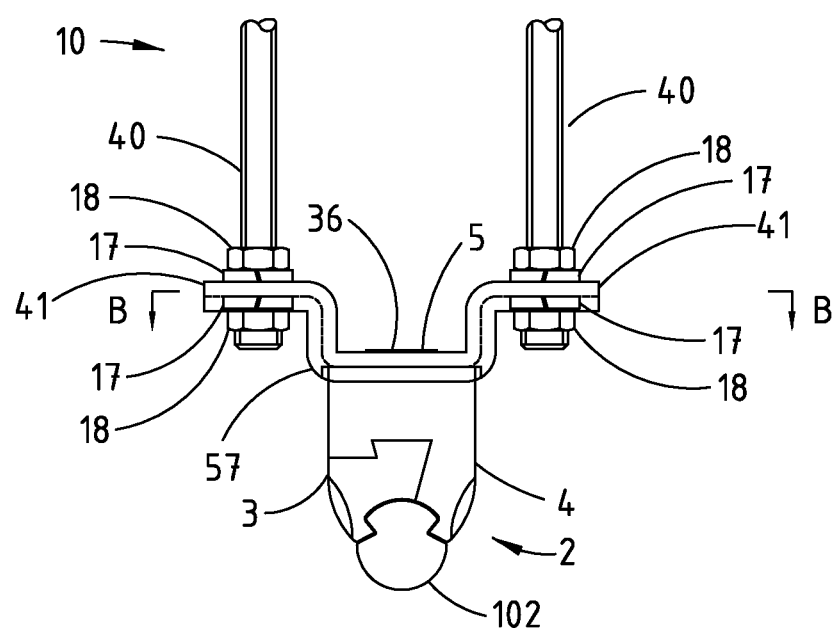
FIG. 13A is a view in front elevation of an alternative embodiment of the invention.
Figure 13B:
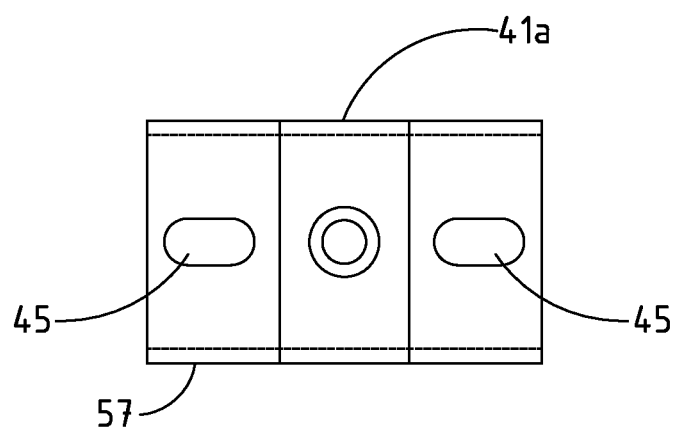
FIG. 13B is a plan view of an embodiment of the base frame member.
Figure 14:
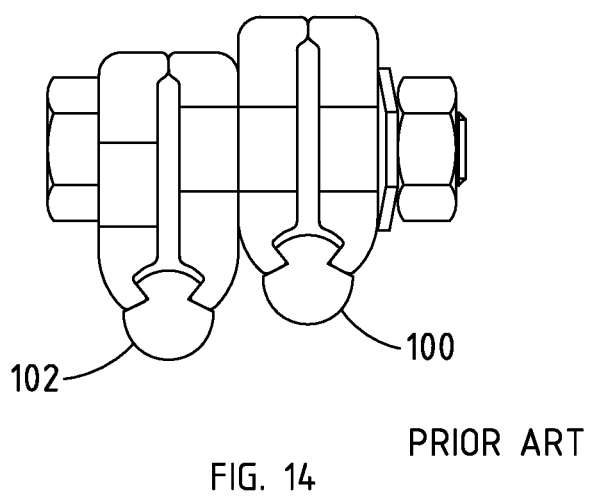
FIG. 14 is a view in front elevation of a contenary clamp assembly according to the prior art.

The flat base frame member 41 of FIG. 13 is crafted to facilitate passage of a trolley pole collector shoe. However, as is illustrated in FIG. 13A, it is disclosed herein that the base frame member 41 could alternatively be stepped in what may be referred to as an inverted omega shape by having a central portion for engaging the clamping assembly 2 and then upwardly stepped first and second outboard portions for engaging the threaded rods 40 thereby providing further clearance for the collector shoe 108 and the upper portions of the shoe walls 110 as are depicted in relation to the embodiment of the hanger 1 shown in FIG. 11. Looking further to FIG. 13B, one can perceive the stepped lower frame member 41 in a plan view. There, the lower frame member 41 can be perceived to have slotted apertures 45 therein to permit lateral spacing adjustment of the threaded rods 40.

Figure 16A:
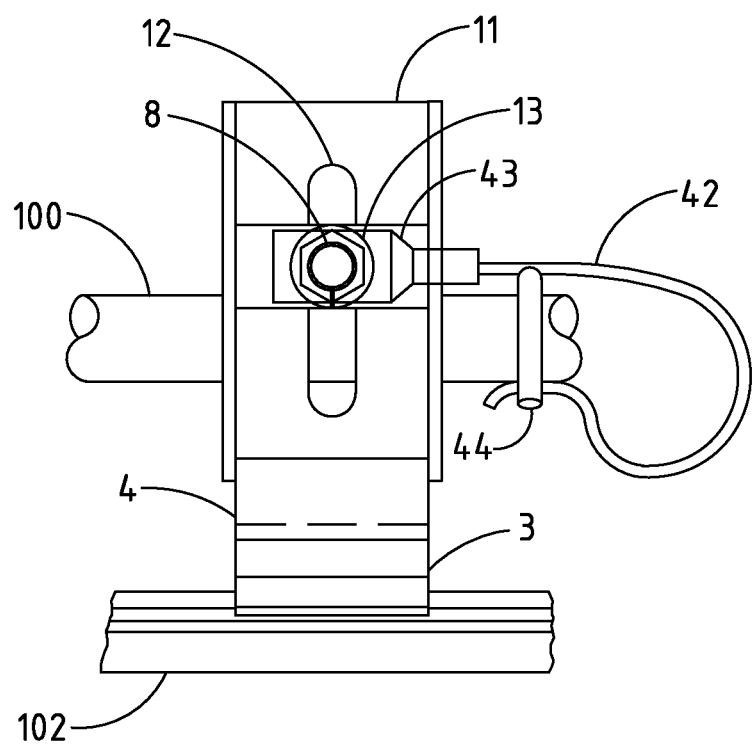
FIG. 16A is a view in side elevation of the U-shaped member embodiment of the present invention incorporating a pig-tail wire.
Figure 16B:
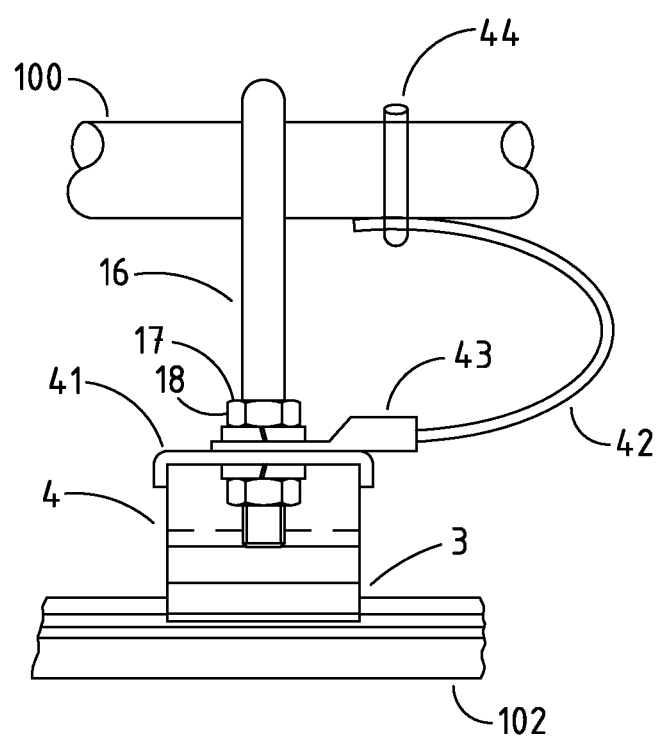
FIG. 16B is a view in side elevation of the U-bolt embodiment of the present invention incorporating a pig-tail wire.

According to each of the embodiments of the invention, electrically-conductive, 'pig-tail' wires can be employed to promote the arc-free passage of electrical current through the catenary hanger 1. More particularly and with referenced to FIGS. 16A and 16B, a pig-tail wire 42 can be operative to provide a continuous electrical connection between the messenger wire 100, the catenary hanger 1, and the supported trolley contact wire 102. The incorporation of a pig-tail wire 42 is shown in FIG. 16A in relation to a low-profile catenary hanger 1 as in FIG. 1 while a pig-tail wire 42 is shown in FIG. 16B in relation to a low-profile catenary hanger 1 as in FIG. 3. In each example, a first end of the pig-tail wire 42 is connected to a wire lug 43 that is fixed in relation to the U-shaped member 11 by the cross-bolt 8 and the nut 13 and lock washer 14 fastened thereto and a second end of the pig-tail wire 42 is fixed to the messenger wire 100 by a spring clamp 44. The body portion of the pig-tail wire 42 spans between the first and the second ends with sufficient excess length and slack to permit free vertical movement of the catenary hanger 1 in relation to the messenger wire 100. In a similar manner, the first end of the pig-tail wire 42 in FIG. 16B is connected to a wire lug 43 that is fixed in relation to the U-bolt 16 and the hanger 1 in general by the nut 17 and lock washer 18 combination and the second end of the pig-tail wire 42 is again retained relative to the messenger wire 100 by a spring clamp 44 while the body portion of the wire 42 traverses therebetween with sufficient slack to permit unhindered movement of the hanger 1 in relation to the messenger wire 100.

Figure 19:
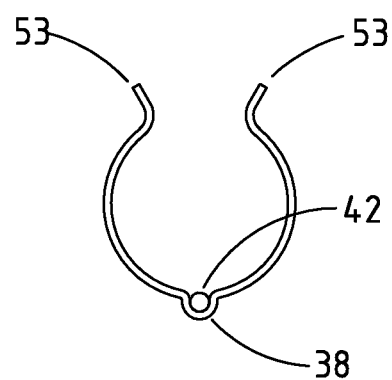
FIG. 19 is a view in front elevation of a spring clamp with a pig-tail wire according to the present invention.

The spring clip 44 and the second end of the pig-tail wire 42 are shown apart in FIG. 19. The spring clip 44 can pursue different constructions within the scope of the invention. In certain practices, the spring clip 44 is crafted from a round or flat cross-section non-ferrous spring material with an inwardly-facing receiving notch 38 formed therein for receiving and retaining the pig-tail wire 42 and first and second bent ends 53 that permit a gripping and installation and removal of the spring clip 44 and the pig-tail wire 42 in relation to the messenger wire 100. When placed on the messenger wire 1 with the pig-tail wire 42 retained as depicted in the receiving notch 38, the pig-tail wire 42 is securely retained in electrical contact with the messenger wire 100 thereby ensuring an electrical connection between the messenger wire 100 and the catenary hanger 1.

Figure 9:
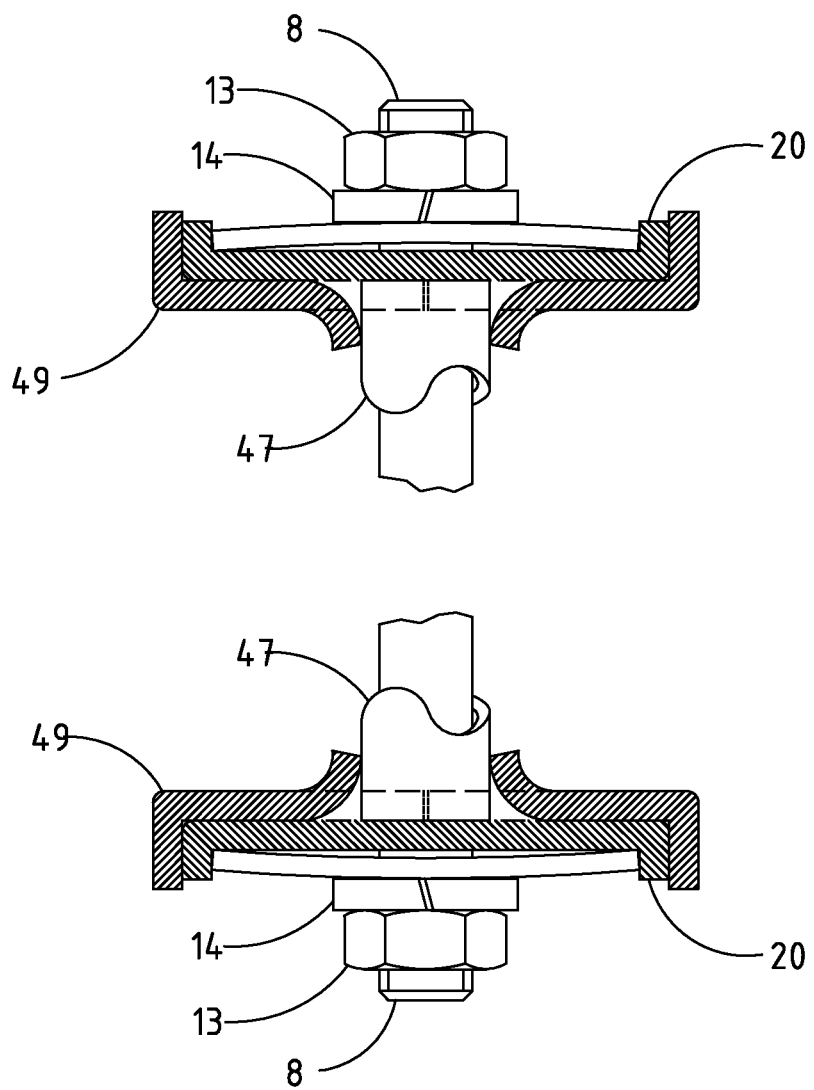
FIG. 9 is a cross-sectioned view of the U-shaped member taken along the line A-A in FIG. 1 with an insulating barrier retained to line the U-shaped member.
Figure 17:
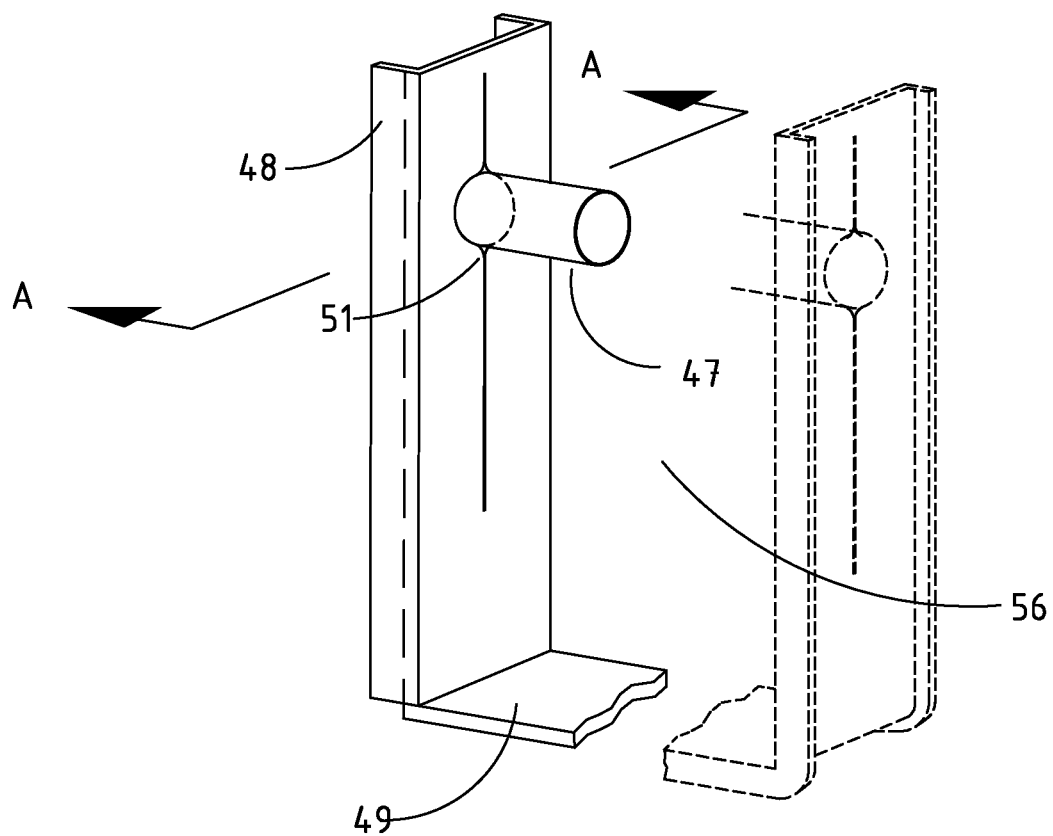
FIG. 17 is a perspective view of an insulating barrier pursuant to the invention.

Embodiments of the catenary hanger 1 can incorporate electrical insulation interposed between the hanger 1 and the messenger wire 100. One illustrated example is depicted in FIG. 17. There, an insulating barrier 49 is sized and shaped in correspondence to the size and shape of the corral assembly 10 of the catenary hanger 1 to line the inside thereof against electrical contact with the messenger wire 100. In this manifestation, the insulating barrier 49 is configured for engagement with the catenary hanger 1 of FIG. 1 as is further illustrated in FIG. 9, but it will be understood that insulating barriers 49 can readily be adapted to each embodiment disclosed herein. In each embodiment, the insulating barrier 49 is formed from an insulating material that is formed to fit the interior shape of the corral assembly 10, in this example, the U-shaped member 11. The insulating barrier 49 has a base portion and first and second formed legs 48 that fit over and around the formed sides of the U-shaped member 11 to prevent electrical contact and to maintain the barrier 49 in position. The insulating barrier 49 has longitudinal openings 51, more specifically slits, along the first and second legs 48 that are disposed to align with the slots 12 in the U-shaped member 11 for receiving the cross-bolt 8 therethrough, and an electrically-insulating tube 47, which may supplement or replace the spacer tube 9, is provided for receiving the bolt 8 therethrough. So positioned, the insulating barrier 49 and the insulating spacer tube 47 create an electrically-insulated reception passage 56 where all surfaces that the messenger wire 100 can touch are non-conducting. The catenary hanger 1 can thus be rendered insulated and non-conducting with respect to the messenger wire 100.

Figure 18:
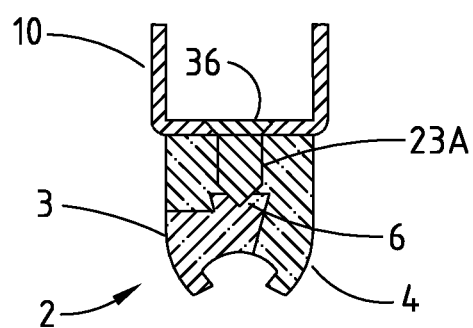
FIG. 18 is a view in front elevation of a ceramic clamping assembly as disclosed herein.

In FIG. 18, an alternative embodiment of the clamp assembly 2 is illustrated in cross section. There, the first and second clamps 3 and 4 are crafted from an industrial grade ceramic material with high mechanical strength and high dielectric strength. So constructed, the clamp assembly 2 is capable of being assembled with a corral assembly 10 according to any embodiment of the invention to provide a non-conducting catenary hanger 1 that becomes an electrical barrier between the trolley contact wire 102 and the corral assembly 10, which will typically be in an energized state due to the contact of the metallic components thereof with the messenger wire 100. As previously described, the corral assembly 10 can be fixed to the clamp assembly 2 by a setscrew 36. When tightened into the tapped borehole 23A, the conical tip 24 of the setscrew 36 applies force against the conical dimple 6 in the first clamping member 3 to press the first clamping member 3 into tight, locking engagement with the second clamping member 4 and, concomitantly, for the first and second engaging teeth 7A and 7B to be pressed into locking engagement with the grooves 104 and 106 of the trolley contact wire 102. The surfaces of the engaging teeth 7A and 7B can have surface texture, such as knurling, teeth, serrations, or any other surface formation pattern 37, along the lengths thereof operative to further secure the clamping members 3 and 4 to the grooves 104 and 106 of the trolley contact wire 102 as shown in FIG. 12.

It will be understood that terms of orientation, nomenclature, and other conventions used herein merely provide a complete understanding of the disclosed invention and are not limiting. Other conventions may be used without limitation of the teachings herein. Furthermore, the various components disclosed herein are merely illustrative and are not limiting of the invention. For example, except as limited by the claims, each of the components and steps discussed herein may include subcomponents or substeps that collectively provide for the structure and function of the disclosed component or step. Still further, one or more components or steps, sometimes referred to as members or otherwise herein, could be combined as a unitary structure or a single step while still corresponding to the disclosed components or steps. Additional components and steps that provide additional functions, or enhancements to those introduced herein, may be included. For example, additional components, steps, and materials, combinations of components, steps, or materials, and perhaps the omission of components, steps, or materials may be used to create embodiments that are nonetheless within the scope of the teachings herein.

When introducing elements of the present invention or embodiments thereof, the articles "a," "an," and "the" are intended to mean that there are one or more of the elements. The terms "comprising," "including," and "having" are intended to be inclusive such that there may be additional elements other than the listed elements. As used herein, the term "example" or "exemplary" is not intended to imply a superlative example. Rather, "exemplary" refers to an embodiment that is one of many possible embodiments.

With certain details and embodiments of the present invention for a low-profile catenary hanger disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. A plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

The invention claimed is:

1. A low-profile hanger for supporting a supported wire in relation to a supporting wire, the low-profile hanger comprising:
   a wire clamping assembly operative to clamp about the supported wire, wherein the clamping assembly comprises first and second clamping members, wherein the first clamping member has a keystone-shaped projection, and wherein the second clamping member has a keystone-shaped slot that is sized and shaped in correspondence to the keystone-shaped projection whereby the keystone-shaped projection of the first clamping member can be slidably received into the keystone-shaped slot in the second clamping member;
   a wire corral assembly fixed to the clamping assembly, wherein the wire corral assembly defines a wire reception corral through which the supporting wire can be received, wherein the wire reception corral is adapted to have a height greater than a cross-sectional height of the supporting wire, and wherein the wire corral assembly is adapted to receive the supporting wire without attachment thereto whereby the supporting wire can move freely within the wire reception corral;
   a threaded borehole through the second clamping member wherein the threaded borehole has an end open to the keystone-shaped slot;
   a setscrew for being received into the borehole to press against the keystone-shaped projection of the first clamping member to fix the first clamping member relative to the second clamping member;
   whereby, when the supported wire is clamped by the wire clamping assembly and when the supporting wire passes through the wire corral assembly, the supported wire can rise a given amount without a consequent lifting of the supporting wire.

2. The low-profile hanger of claim 1, wherein the clamping assembly comprises first and second clamping members, wherein the first clamping member has a keystone-shaped projection, and wherein the second clamping member has a keystone-shaped slot that is sized and shaped in correspondence to the keystone-shaped projection whereby the keystone-shaped projection of the first clamping member can be slidably received into the keystone-shaped slot in the second clamping member.

3. The low-profile hanger of claim 1, wherein the first and second clamping members cooperate to define a supported wire reception volume and wherein the first and second clamping members are operative to receive and selectively clamp upon the supported wire within the supported wire reception volume.

4. The low-profile hanger of claim 3, wherein the hanger is adapted to support a supported wire that has opposed first and grooves that communicate longitudinally along the supported wire, wherein the first clamping member has a first engaging tooth for being received into the first groove of the supported wire, wherein the second clamping member has a second engaging tooth for being received into the second groove of the supported wire, and wherein the first and second teeth are disposed in opposition when the first clamping member is engaged with the second clamping member.

5. The low-profile hanger of claim 1, wherein the wire corral assembly has a base member fixed to the clamping assembly, first and second leg portions that project in opposition to one another and away from the base member, and an upper portion that spans between the first and second leg portions wherein the base member, the first and second leg portions, and the upper portion cooperate to define the wire reception corral through which the supporting wire can be received.

6. A low-profile hanger for supporting a supported wire in relation to a supporting wire, the low-profile hanger comprising:
  a wire clamping assembly operative to clamp about the supported wire;
  a wire corral assembly fixed to the clamping assembly, wherein the wire corral assembly defines a wire reception corral through which the supporting wire can be received, wherein the wire reception corral is adapted to have a height greater than a cross-sectional height of the supporting wire, wherein the wire corral assembly is adapted to receive the supporting wire without attachment thereto whereby the supporting wire can move freely within the wire reception corral, wherein the wire corral assembly has a base member fixed to the clamping assembly, first and second leg portions that project in opposition to one another and away from the base member, and an upper portion that spans between the first and second leg portions, wherein the base member, the first and second leg portions, and the upper portion cooperate to define the wire reception corral through which the supporting wire can be received, wherein the wire corral assembly is formed with a U-shaped member, wherein a base of the U-shaped member forms the base member of the wire corral assembly, wherein legs of the U-shaped member form the first and second leg portions of the wire corral assembly, wherein a cross-bolt forms the upper portion of the wire corral assembly, and wherein the cross-bolt spans across the first and second leg portions of the wire corral assembly;
  whereby, when the supported wire is clamped by the wire clamping assembly and when the supporting wire passes through the wire corral assembly, the supported wire can rise a given amount without a consequent lifting of the supporting wire.

7. The low-profile hanger of claim 6, further comprising slots in the first and second leg portions of the U-shaped member, wherein the cross-bolt can be adjusted in position along the slots in the first and second leg portions to adjust the height of the wire reception corral.

8. A low-profile hanger for supporting a supported wire in relation to a supporting wire, the low-profile hanger comprising:
  a wire clamping assembly operative to clamp about the supported wire;
  a wire corral assembly fixed to the clamping assembly, wherein the wire corral assembly defines a wire reception corral through which the supporting wire can be received, wherein the wire reception corral is adapted to have a height greater than a cross-sectional height of the supporting wire, wherein the wire corral assembly is adapted to receive the supporting wire without attachment thereto whereby the supporting wire can move freely within the wire reception corral, wherein the wire corral assembly has a base member fixed to the clamping assembly, first and second leg portions that project in opposition to one another and away from the base member, and an upper portion that spans between the first and second leg portions, wherein the base member, the first and second leg portions, and the upper portion cooperate to define the wire reception corral through which the supporting wire can be received, wherein the wire corral assembly is formed with a base frame member fixed to the clamping assembly to form the base member of the wire corral assembly and a U-bolt with first and second legs that form the first and second leg portions of the wire corral assembly and with an arcuate portion that spans between the first and second legs to form the upper portion of the wire corral assembly, wherein the first and second legs of the U-bolt are threaded and further comprising threaded fasteners for selectively fixing the first and second legs of the U-bolt relative to the base frame member whereby the threaded fasteners can be selectively advanced or retracted along the first and second legs of the U-bolt to adjust the height of the wire reception corral;
  whereby, when the supported wire is clamped by the wire clamping assembly and when the supporting wire passes through the wire corral assembly, the supported wire can rise a given amount without a consequent lifting of the supporting wire.

9. The low-profile hanger of claim 8, further comprising flanges that project from the base member toward the clamping assembly, wherein the flanges are spaced by a distance, wherein the clamping assembly has first and second end faces for being received at least partially between the flanges that project from the base member, and wherein the first and second end faces of the clamping assembly are spaced to be closely received between the flanges that project from the base member whereby relative rotation between the corral assembly and the clamping assembly is prevented.

10. The low-profile hanger of claim 8, wherein the clamping assembly comprises first and second clamping members, wherein the first clamping member has a locking projection, and wherein the second clamping member has a locking slot sized and shaped in correspondence to the locking projection whereby the locking projection of the first clamping member can be slidably received into the locking slot in the second clamping member and further comprising a threaded borehole through the second clamping member wherein the threaded borehole has an end open to the locking slot and further comprising a setscrew for being received into the borehole to press against the locking projection of the first clamping member to fix the first clamping member relative to the second clamping member.

11. The low-profile hanger of claim 10, wherein the setscrew passes through the base member of the wire corral assembly to fix the wire corral assembly to the clamping assembly.

12. The low-profile hanger of claim 10, wherein the first and second clamping members are formed from a ceramic material.

13. A low-profile hanger for supporting a supported wire in relation to a supporting wire, the low-profile hanger comprising:
- a wire clamping assembly operative to clamp about the supported wire;
- a wire corral assembly fixed to the clamping assembly, wherein the wire corral assembly defines a wire reception corral through which the supporting wire can be received, wherein the wire reception corral is adapted to have a height greater than a cross-sectional height of the supporting wire, and wherein the wire corral assembly is adapted to receive the supporting wire without attachment thereto whereby the supporting wire can move freely within the wire reception corral, wherein the wire corral assembly has a base member fixed to the clamping assembly, first and second leg portions that project in opposition to one another and away from the base member, and an upper portion that spans between the first and second leg portions, wherein the base member, the first and second leg portions, and the upper portion cooperate to define the wire reception corral through which the supporting wire can be received, wherein the wire corral assembly is formed with a base frame member fixed to the clamping assembly to form the base member of the wire corral assembly, first and second rods that form the first and second leg portions of the wire corral assembly, and an upper frame member retained by the first and second rods to form the upper portion of the wire corral assembly, wherein the first and second rods are threaded and further comprising threaded fasteners for selectively fixing the upper frame member relative to the base frame member whereby the threaded fasteners can be selectively advanced or retracted along the first and second rods to adjust the height of the wire reception corral;
- whereby, when the supported wire is clamped by the wire clamping assembly and when the supporting wire passes through the wire corral assembly, the supported wire can rise a given amount without a consequent lifting of the supporting wire.

14. A low-profile hanger for supporting a supported wire in relation to a supporting wire, the low-profile hanger comprising:
- a wire clamping assembly operative to clamp about the supported wire;
- a wire corral assembly fixed to the clamping assembly, wherein the wire corral assembly defines a wire reception corral through which the supporting wire can be received, wherein the wire reception corral is adapted to have a height greater than a cross-sectional height of the supporting wire, wherein the wire corral assembly is adapted to receive the supporting wire without attachment thereto whereby the supporting wire can move freely within the wire reception corral, wherein the wire corral assembly has a base member fixed to the clamping assembly, first and second leg portions that project in opposition to one another and away from the base member, and an upper portion that spans between the first and second leg portions, wherein the base member, the first and second leg portions, and the upper portion cooperate to define the wire reception corral through which the supporting wire can be received, and wherein the base member has a central portion and first and second wing portions that are stepped upwardly relative to the base member away from the clamping assembly thereby providing clearance for passage of a trolley pole current collector shoe past the clamping assembly;
- whereby, when the supported wire is clamped by the wire clamping assembly and when the supporting wire passes through the wire corral assembly, the supported wire can rise a given amount without a consequent lifting of the supporting wire.

15. The low-profile hanger of claim 14, further comprising an electrically-conductive pig-tail wire for promoting arc-free passage of electrical current through the catenary hanger wherein the pig-tail wire has a first end electrically connected to the wire corral assembly and a second end for connecting to the supporting wire.

16. A low-profile hanger for supporting a supported wire in relation to a supporting wire, the low-profile hanger comprising:
- a wire clamping assembly operative to clamp about the supported wire;
- a wire corral assembly fixed to the clamping assembly, wherein the wire corral assembly defines a wire reception corral through which the supporting wire can be received, wherein the wire reception corral is adapted to have a height greater than a cross-sectional height of the supporting wire, and wherein the wire corral assembly is adapted to receive the supporting wire without attachment thereto whereby the supporting wire can move freely within the wire reception corral;
- an electrically-conductive pig-tail wire for promoting arc-free passage of electrical current through the catenary hanger wherein the pig-tail wire has a first end electrically connected to the wire corral assembly and a second end for connecting to the supporting wire;
- a spring clip for being selectively received over the supporting wire wherein the spring clip has a receiving notch for receiving and retaining the pig-tail wire;
- whereby, when the supported wire is clamped by the wire clamping assembly and when the supporting wire passes through the wire corral assembly, the supported wire can rise a given amount without a consequent lifting of the supporting wire.

17. The low-profile hanger of claim 16, further comprising an insulating barrier of insulative material sized and shaped in correspondence to the wire corral assembly for lining the inside of the wire corral assembly against electrical contact with the supporting wire.

18. A wire clamping assembly for clamping about a wire, the wire clamping assembly comprising:
- a first clamping member with a locking projection;
- a second clamping member with a locking slot sized and shaped in correspondence to the locking projection wherein the locking projection of the first clamping member can be slidably received into the locking slot in the second clamping member;
- a threaded borehole through the second clamping member wherein the threaded borehole has an end open to the locking slot;
- a setscrew for being received into the borehole to press against the locking projection of the first clamping member to fix the first clamping member relative to the second clamping member;

wherein the first and second clamping members cooperate to define a supported wire reception volume and wherein the first and second clamping members are operative to receive and selectively clamp upon the wire within the wire reception volume.

19. The wire clamping assembly of claim 18, wherein the locking projection comprises a keystone-shaped projection and wherein the locking slot comprises a keystone-shaped slot whereby the keystone-shaped projection of the first clamping member can be slidably received into the keystone-shaped slot in the second clamping member.

20. The wire clamping assembly of claim 18, wherein the wire clamping assembly is adapted to clamp upon a wire that has opposed first and grooves that communicate longitudinally along the supported wire, wherein the first clamping member has a first engaging tooth for being received into the first groove of the supported wire, wherein the second clamping member has a second engaging tooth for being received into the second groove of the supported wire, and wherein the first and second teeth are disposed in opposition when the first clamping member is engaged with the second clamping member.

21. A catenary wire system with a low-profile catenary hanger supporting an electrical contact wire in relation to a messenger wire, the catenary wire system comprising:
   a messenger wire that traverses a span;
   an electrical contact wire retained below the messenger wire;
   a wire clamping assembly operative to clamp about the electrical contact wire wherein the wire clamping assembly comprises first and second clamping members, wherein the first clamping member has a locking projection, wherein the second clamping member has a locking slot sized and shaped in correspondence to the locking projection, and wherein the locking projection and the locking slot communicate longitudinally along the first and second clamping members respectively whereby the locking projection of the first clamping member can be slidably received into the locking slot in the second clamping member;
   a threaded borehole through the second clamping member wherein the threaded borehole has an end open to the locking slot;
   a setscrew for being received into the borehole to press against the locking projection of the first clamping member to fix the first clamping member relative to the second clamping member,
   a wire corral assembly fixed to the clamping assembly, wherein the wire corral assembly defines a wire reception corral through which the messenger wire is received, wherein the wire reception corral is adapted to have a height greater than a cross-sectional height of the messenger wire;
   wherein the wire corral assembly is not fastened to the messenger wire whereby the messenger wire can move freely within the wire reception corral;
   whereby, when the electrical contact wire is clamped by the wire clamping assembly and when the messenger wire passes through the wire corral assembly, the electrical contact wire can rise a given amount without a consequent lifting of the messenger wire.

22. The catenary wire system of claim 21, wherein the wire reception corral is adjustable in height.

23. The catenary wire system of claim 21, wherein the first and second clamping members cooperate to define a supported wire reception volume, wherein the first and second clamping members are operative to receive and selectively clamp upon the supported wire within the supported wire reception volume, wherein the electrical contact wire has opposed first and grooves that communicate longitudinally along the supported wire, wherein the first clamping member has a first engaging tooth for being received into the first groove of the supported wire, wherein the second clamping member has a second engaging tooth for being received into the second groove of the supported wire, and wherein the first and second teeth are disposed in opposition when the first clamping member is engaged with the second clamping member.

24. A method for suspending an electrical contact wire below a messenger wire by use of a low-profile catenary hanger, the method comprising:
   providing a wire clamping assembly operative to clamp about the electrical contact wire wherein the wire clamping assembly comprises first and second clamping members, wherein the first clamping member has a locking projection, wherein the second clamping member has a locking slot sized and shaped in correspondence to the locking projection, and wherein the locking projection and the locking slot communicate longitudinally along the first and second clamping members respectively whereby the locking projection of the first clamping member can be slidably received into the locking slot in the second clamping member;
   providing a wire corral assembly fixed to the clamping assembly, wherein the wire corral assembly defines a wire reception corral through which the messenger wire can be received, wherein the wire reception corral is adapted to have a height greater than a cross-sectional height of the messenger wire;
   providing a threaded borehole through the second clamping member wherein the threaded borehole has an end open to the locking slot;
   providing a setscrew for being received into the borehole to press against the locking projection of the first clamping member to fix the first clamping member relative to the second clamping member;
   clamping the wire clamping assembly on the electrical contact wire;
   causing the messenger wire to pass through the wire corral assembly within the wire reception corral wherein the wire corral assembly is not fastened to the messenger wire whereby the messenger wire can move freely within the wire reception corral;
   whereby the electrical contact wire can rise a given amount without a consequent lifting of the messenger wire.

25. The method of claim 24, wherein the first and second clamping members cooperate to define a supported wire reception volume, wherein the first and second clamping members are operative to receive and selectively clamp upon the supported wire within the supported wire reception volume, wherein the electrical contact wire has opposed first and grooves that communicate longitudinally along the supported wire, wherein the first clamping member has a first engaging tooth for being received into the first groove of the supported wire, wherein the second clamping member has a second engaging tooth for being received into the second groove of the supported wire, and wherein the first and second teeth are disposed in opposition when the first clamping member is engaged with the second clamping member.

26. The method of claim 24, wherein the wire corral assembly has a base member fixed to the clamping assembly, first and second leg portions that project in opposition to one another and away from the base member, and an upper portion that spans between the first and second leg portions, wherein the base member, the first and second leg portions, and the upper portion cooperate to define the wire reception corral through which the supporting wire can be received, and wherein a distance between the base member and the upper portion is adjustable.

\* \* \* \* \*